US011897252B2

(12) United States Patent
Chassot et al.

(10) Patent No.: US 11,897,252 B2
(45) Date of Patent: Feb. 13, 2024

(54) INK FEED SYSTEMS AND METHOD FOR FEEDING PRINTING INK TO AN INKING UNIT OF AN INTAGLIO PRINTING UNIT, AS WELL AS INTAGLIO PRINTING UNIT AND METHOD FOR OPERATING AN INK FEED SYSTEM

(71) Applicant: KOENIG & BAUER AG, Würzburg (DE)

(72) Inventors: Daniel Chassot, Bienne (CH); Robert Stierman, Alphen aan den Rijn (NL)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 18/028,061

(22) PCT Filed: Dec. 16, 2021

(86) PCT No.: PCT/EP2021/086170
§ 371 (c)(1),
(2) Date: Mar. 23, 2023

(87) PCT Pub. No.: WO2022/174958
PCT Pub. Date: Aug. 25, 2022

(65) Prior Publication Data

US 2023/0271411 A1 Aug. 31, 2023

(30) Foreign Application Priority Data

Feb. 18, 2021 (DE) ..................... 10 2021 103 845.6
Feb. 18, 2021 (DE) ..................... 10 2021 103 846.4
Feb. 18, 2021 (DE) ..................... 10 2021 103 847.2

(51) Int. Cl.
*B41F 9/06* (2006.01)
*B41F 31/00* (2006.01)
(Continued)

(52) U.S. Cl.
CPC ............ *B41F 9/063* (2013.01); *B41F 31/002* (2013.01); *B41F 31/027* (2013.01); *B41F 31/06* (2013.01)

(58) Field of Classification Search
CPC .......... B41F 9/063; B41F 9/061; B41F 31/02; B41F 31/022; B41F 31/08
See application file for complete search history.

(56) References Cited

U.S. PATENT DOCUMENTS 4,066,014 A 1/1978 Van Haaften
4,604,951 A * 8/1986 Ichikawa ................ B41F 31/10 101/352.13
(Continued)

FOREIGN PATENT DOCUMENTS

CN 110450522 A * 11/2019
DE 4116989 A1 11/1992
(Continued)

OTHER PUBLICATIONS

International Search Report of PCT/EP2021/086170 dated May 3, 2022.

*Primary Examiner* — Matthew G Marini
*Assistant Examiner* — Leo T Hinze
(74) *Attorney, Agent, or Firm* — MATTINGLY & MALUR, PC

(57) ABSTRACT

In some examples, an ink feed system for providing and feeding printing ink to an inking unit of an intaglio printing unit includes an inking device in the inking unit for inking a first inking unit cylinder. A provision device includes a storage receptacle with an ink reservoir of printing ink that is fed via an outlet and a line to the inking device. Furthermore, a wall of the storage receptacle encompassing the outlet can be heated and/or a metering device may be provided in the line path to support and/or effectuate delivery of the printing ink from the storage receptacle. On an
(Continued)

output side, the metering device may provide a mass flow or volume flow that correlates with a working speed of the metering device via a defined relationship, and the metering device may be connected to a control device to control the working speed of the metering device.

9 Claims, 8 Drawing Sheets

(51) Int. Cl.

| | |
|---|---|
| ***B41F 31/02*** | (2006.01) |
| ***B41F 31/06*** | (2006.01) |

(56) References Cited

U.S. PATENT DOCUMENTS

| | | | | |
|---|---|---|---|---|
| 5,671,678 | A | 9/1997 | Bolte et al. | |
| 6,024,015 | A | 2/2000 | Dilling et al. | |
| 6,516,721 | B1 | 2/2003 | Voge | |
| 2001/0011512 | A1 | 8/2001 | Koehler | |
| 2014/0158005 | A1* | 6/2014 | Kaya | B41F 31/03 101/366 |
| 2014/0182467 | A1 | 7/2014 | Ihme et al. | |

FOREIGN PATENT DOCUMENTS

| | | | | |
|---|---|---|---|---|
| DE | 4137337 | A1 | 5/1993 | |
| DE | 10206290 | A1 | 9/2002 | |
| DE | 10246946 | A1 | 5/2003 | |
| DE | 202007005544 | U1 | 8/2008 | |
| DE | 102008011007 | A1 | 9/2009 | |
| DE | 102008022988 | A1 | 11/2009 | |
| DE | 102013003923 | A1 | 10/2013 | |
| DE | 102015010126 | A1 | 2/2017 | |
| DE | 102016209031 | B4 | 6/2019 | |
| DE | 102019103784 | A1 | 8/2020 | |
| EP | 0924071 | A1 | 6/1999 | |
| GB | 2074097 | A * | 10/1981 | B41F 31/08 |
| WO | 2020161056 | A1 | 8/2020 | |
| WO | 2020224815 | A1 | 11/2020 | |

* cited by examiner

INK FEED SYSTEMS AND METHOD FOR FEEDING PRINTING INK TO AN INKING UNIT OF AN INTAGLIO PRINTING UNIT, AS WELL AS INTAGLIO PRINTING UNIT AND METHOD FOR OPERATING AN INK FEED SYSTEM

CROSS-REFERENCES TO RELATED APPLICATIONS

This application is the US national phase, under 35 USC § 371, of PCT/EP2021/086170, filed on Dec. 16, 2021, published as WO 2022/174958 A1 on Aug. 25, 2022, and claiming priority to DE 10 2021 103 847.2, filed Feb. 18, 2021; DE 10 2021 103 846.4, filed Feb. 18, 2021; and DE 10 2021 103 845.6, the disclosures of which are expressly incorporated by reference herein in their entireties.

TECHNICAL FIELD

Some examples herein relate to ink feed systems and to a method for feeding printing ink to an inking unit of an intaglio printing unit that includes an inking device, which is provided in the inking unit, and includes a provision device by which printing ink can be fed to the inking device via at least one line. The provision device comprises a storage receptacle in which an ink reservoir of printing ink can be kept available and which has an outlet through which the printing ink can be transferred from the storage receptacle into the line path leading to the inking device. The provision device includes at least one delivery device that supports and/or effectuates the delivery of the printing ink from the storage receptacle.

Some examples, further relate to an ink feed system for providing and feeding printing ink to an inking unit of an intaglio printing unit, including an inking device that is provided in the inking unit, and a provision device, by which printing ink can be fed to the inking device via at least one line. The provision device includes a storage receptacle in which an ink reservoir of printing ink can be kept available and which has an outlet in a wall of part of a structure delimiting the space for the ink reservoir in the storage receptacle, and through which the printing ink can be transferred from the ink reservoir into the line path leading to the inking device. The provision device further includes a metering device that is controllable with respect to the working speed and/or a delivery device that supports and/or effectuates the delivery of the printing ink from the storage receptacle.

Some examples further relate to a method for feeding intaglio printing ink to an ink supply chamber of an inking device of an intaglio printing unit, by which a first inking unit cylinder of an inking unit comprised by the printing unit is inked on its outer cylindrical surface with printing ink provided in the ink supply chamber. The printing ink is fed from a storage receptacle, in which an ink reservoir of printing ink is kept available, to the ink supply chamber.

Some examples further relate to an intaglio printing unit and to a method for operating an ink feed system for feeding printing ink to an ink supply chamber of an inking device of an inking unit comprised by a printing unit. The printing ink to be fed being fed to the ink supply chamber via a delivery device that is located in the delivery path of the printing ink and that is configured as a metering device. A feed rate may be variable via a control variable, which determines the work cycle rate of a delivery mechanism of the metering device by control means of a control device. A target or starting value, which is suitable for a production operation of the printing unit, may be ascertained for the control variable of the metering device.

BACKGROUND

A method and a device for feeding printing ink in the inking unit of a printing press is known from EP 0 924 071 A1, wherein a cartridge comprising a displaceable cartridge piston is assigned to an ink fountain for metered filling. The cartridge piston can be acted upon pneumatically for the pressure discharge of the cartridge. A closable outlet is provided at the end of the cartridge located opposite the cartridge piston.

WO 2020/161056 A1 relates to gravure printing units of a printing press, wherein a selective ink infeed into the printing unit takes place in that a first inking unit cylinder cooperating with an inking device has recesses that correspond to individual recesses on the gravure cylinder.

U.S. Pat. No. 4,066,014 A relates to a pressurized ink applicator of an intaglio printing press, with ink being directly applied to the engraved forme cylinder by the applicator. The applicator comprises a supporting structure including a mounting plate and a nozzle assembly arranged thereon so as to be able to be pivoted away. Ink containers can be inserted or are inserted into the supporting structure, which either contain a certain fill volume and are emptied, or are continuously filled from the outside via a line. Heating elements can be provided in the mounting plate, and possibly further downstream in the environment of the nozzles. In the variant using continuous filling, the printing ink can be supplied from an ink reservoir, arranged at a distance, by a displacement pump via a line, which comprises a measuring device and manual control means, to the applicator or the ink containers.

DE 102 06 290 A1 relates to the supply of an anilox roller with ink, wherein the printing ink is kept available in an ink reservoir and, in one embodiment, the temperature of the ink is controlled by way of a temperature-controlled wall of the reservoir. The printing ink leaves the reservoir in a heated bottom region via a pump that is provided there.

DE 20 2007 005 544 U1 likewise relates to the supply of a chamber doctor blade cooperating with an anilox roller of a flexographic printing mechanism. There, the ink is pumped out of a lower region of an ink container in a circuit system and the temperature thereof is controlled by a temperature control in the bottom region of the container.

DE 41 37 337 A1 discloses an ink supply for a letterpress printing method using an anilox roller. The ink is pumped out of a supply container through an outlet in the cover by means of a pump. The bottom of the container is temperature-controlled.

DE 41 16 989 A1 relates to an ink supply, wherein an ink or varnish trough is supplied in a circuit system with a conditioned ink stream from a mixing vessel having a vessel bottom that is configured to be temperature-controllable. To avoid a drying-out in the trough, an excess quantity of ink is fed via a pump, and recirculation into the mixing reservoir takes place via a further pump. The fill level in the trough is monitored by way of a maximum fill level, at which any inflow is blocked, a minimum fill level, at which the fill level height is to be raised, and a target fill level, at which no further filling is required.

DE 10 2008 022 988 A1 relates to a sheet-fed printing press comprising a system for supplying a chamber doctor blade with fluid. The fluid circulates between a fluid reservoir and the doctor blade chamber, wherein the fluid is delivered from the reservoir by a delivery-rate-controllable pump, arranged in the supply line, into the doctor blade chamber.

DE 10 2008 011 007 A1 relates to the supply of offset printing units with ink from an ink container via a system of lines and to a speed-controllable screw spindle pump provided in the system of lines. The ink present in the system of lines, also referred to as an ink reservoir here, is to be protected against excessively high permanent pressure. For this purpose, the pressure is measured, and a target working pressure is maintained by appropriately operating the delivery pump.

DE 102 46 946 A1 relates to a device for coating printing substrates by way of a flexographic or gravure printing unit, wherein, in one operating mode, an excess quantity of coating medium is delivered by a pump from a container into a trough of the metering system, and from there is in part recirculated into the container. In another operating mode, cleaning fluid stemming from a different container can be fed through. A fill level in the trough can be monitored by a sensor.

DE 10 2015 010 126 A1 relates to an ink circuit for a flexographic or gravure printing unit, wherein printing ink is delivered from a reservoir to the inking unit of the printing unit via a line by a double diaphragm pump and is circulated back into the reservoir via a return line by an annular piston pump.

DE 10 2016 209 031 B4 discloses a supply of a chamber doctor blade with coating medium, wherein the coating medium is delivered from a storage container via a flow pump into the doctor blade chamber, and an excess quantity of ink flows out of an outlet at the bottom into a collecting reservoir, and from there is delivered back into the storage container by a return flow pump. With respect to the amount of varnish delivered per unit of time, the flow pump is controlled as a function of an input variable that is proportional to the machine speed. Furthermore, a fill level in the collecting reservoir is detected by way of a sensor system and is controlled, in terms of the return flow out of the same, back into the storage container.

DE 10 2013 003 923 A1 relates to a method for feeding ink to an anilox inking unit, wherein printing ink is replenished by adding a fixed small quantity of printing ink at variable intervals. A sensor system is used to detect five fill level heights in the doctor blade ink fountain, namely a maximum and a minimum fill level, a minimum and a maximum working fill level and a target fill level. When ink is supplied during production printing based on a calculated pilot control, the ink volume is maintained between the minimum and maximum working fill levels after a basic fill level has been reached. This takes place in the manner of a control algorithm, by which the interval, when the maximum working fill level is reached, is increased by a certain first value and, when the minimum working fill level is reached, is decreased by a value that is smaller compared to the first value, according to fixed rules.

US 2001/0011512 A1 relates to a device and to a method for maintaining a minimum level of ink in an ink fountain of a printing press, which comprises an ink fountain level sensor and an ink dispenser, which are mounted on a carriage over the ink fountain. In one embodiment, the metering is carried out by way of a step motor in predetermined amounts of ink.

WO 2020/224815 A1 discloses an intaglio printing press comprising an inking unit, which for selective ink infeed comprises an inking unit cylinder having recesses configured to correspond to engravings on the plate cylinder.

In DE 10 2019 103 784 A1, an inking device of an intaglio printing unit comprises a sensor device, by means of which a measure of the volume of ink present in the ink supply chamber and/or a fill level, but at least information regarding a critical fill level being reached, e.g. a lower and/or an upper limit value of the fill level, can be derived.

US 2014/0182467 A1 relates to a system and a method for measuring the viscosity of printing ink during the printing and ink correction process. A printing press comprises at least one ink supply system, by which ink can be transferred from an inflow point onto the printing substrate, at least one optical measuring device for measuring optical actual values of light, and furthermore an ink volume determination device for determining the weight of at least portions of the printing ink.

U.S. Pat. No. 6,024,015 A discloses an inking device for inking an anilox roller of a printing press, which comprises an ink feed device comprising an ink container. An ink reservoir can be disconnected from the ink feed device. The printing ink is delivered under pressure from the ink container to the ink supply device in a feed line. Via the supply line, the printing ink is pressed into the cups or hatchings of the inking unit roller by means of a pump or conveying roller.

U.S. Pat. No. 6,516,721 B1 relates to an inking unit for a printing press, comprising one or more distributor drums, ink transfer rollers, ink application rollers, an ink reservoir for printing ink, and an ink metering device including at least one electrically controllable valve for metering the printing ink. A high-pressure pumping device for supplying the ink metering device with printing ink at a predefined high pressure from the ink reservoir and a heating device for heating the printing ink to a predefined temperature above room temperature are provided.

SUMMARY

It is the object of some examples herein to devise ink feed systems and a method for feeding printing ink to an inking unit of an intaglio printing unit, and an intaglio printing unit and a method for operating an ink feed system.

The object is achieved in some examples by an ink feed system that includes a metering device in the line path arranged downstream from the at least one delivery device and an outlet, and which is driven by a drive means. On the output side, the metering device can provide a mass flow or volume flow that correlates with the working speed of the metering device via a defined relationship. The metering device is in signal connection with a control device comprising control means that control by open-loop or closed-loop control the working speed of the metering device. The control device and/or the control means may control by open-loop or closed-loop control the working speed of the metering device, and is connected, in terms of signaling, to a source supplying information about the current machine speed. A functional or tabular relationship between a target value of a control variable that may determine the working speed of the metering device and a variable representing a machine speed is stored in the control means, which, when used by the control means, allows the target value to be varied as a function of a variable that can be supplied or is supplied to the control means on the input side and represents a machine speed.

The object may be further achieved by an ink feed system in which the wall of the storage receptacle encompassing the outlet of the storage receptacle includes a heating device by which the wall on at least the side facing the ink reservoir can be heated and/or temperature-controlled.

The object may be further achieved by a method for feeding intaglio printing ink to an ink supply chamber of an inking device of an intaglio printing unit in which a working speed of a metering device located in the delivery path of the printing ink and determining a feed rate is controlled by open-loop or closed-loop control by control means in such a way that, during automatic operation for the feeding of ink, a fill level in the ink supply is maintained in a permitted range between an upper and a lower limit or threshold value, or at a desired target fill level by varying the working speed of the metering device by using a sensor system supplying signals of information regarding the fill level in the ink supply. The fill level-based variation of the working speed of the metering device may take place by a switch between operating modes having different values for a control variable representing the working speed. Additionally, or alternatively, a target value for a control variable determining the working speed of the metering device may be varied as a function of a variable representing a current machine speed that is decisive for the operation of the printing unit.

The object may be further achieved by a method for operating an ink feed system for feeding printing ink to an ink supply chamber of an inking device such that, during a printing operation of the printing unit, one or more cycles are run through, which encompasses or encompass a first phase, in which the ink reservoir, in an undersupply mode, is emptied from an upper limit or threshold value for the fill level in the ink supply chamber to a lower limit or threshold value, and a second phase, in which the ink reservoir, in an oversupply mode, is filled from a lower limit or threshold value to the upper limit or threshold value in the ink supply chamber. As one or more such cycles are run through, a measure of the number of print cycles that were run through during this time and a measure that represents the number of work cycles performed during this time period by the delivery mechanism are ascertained. Taking into consideration the number of considered cycles, the measure of the number of print cycles run through during this time and the measure of the number of work cycles performed during the considered cycle or cycles by the delivery mechanism, the target or starting value for the control variable representing the work cycle rate of the metering device is determined by computing and/or data processing means, and is stored in memory means of the control device for further use.

The advantages that can be achieved with the invention are in particular that printing ink, in particular also high-viscosity printing ink, can be supplied in small amounts and/or continuously to an inking unit of a printing unit, such as is particularly advantageous, for example, during intaglio printing, in particular when using an inking unit cylinder that selectively transfers the printing ink to the inking unit. By feeding ink in a controller manner, and due to the small volume of ink in the ink supply of the inking unit, deterioration of the ink quality as a result of continuous movement and thermal loading can be minimized to the extent possible.

This is of particular importance in connection with an ink feed system for providing and feeding printing ink to an inking unit of an intaglio printing unit, comprising an inking device, which is provided in the inking unit and in particular inks a first inking unit cylinder, and comprising a provision device, by which printing ink can be fed to the inking device via at least one, e.g., tubular or hose-like, line, wherein the provision device comprises a storage receptacle in which a supply of printing ink can be kept available and which has an outlet, through which the printing ink can be transferred from the storage receptacle into the line path leading to the inking device.

For example, so as to be able to deliver high-viscosity printing ink in a particularly well-metered manner to the inking unit, one embodiment of the aforementioned ink feed system not only provides a delivery device, which supports and/or effectuates the delivery of the printing ink out of the storage receptacle, in the line path arranged downstream from the delivery device and the outlet, but also a metering device driven by a drive means, which, on the output side, can provide a mass flow or volume flow that correlates with the working speed of the metering device via a defined relationship. As a result, e.g., the metering of the, for example, viscous printing ink can take place in a more or less force-free manner, while the main load of the transport is borne by the delivery device.

As an alternative or in addition, an aforementioned ink feed system can, in addition to a metering and/or delivery device of a wall encompassing the outlet, of the part structure delimiting the space for the ink supply in the storage receptacle, comprise a heating device, by which the wall on at least the side facing the ink supply can be heated and/or temperature-controlled, e.g., at least across a large surface area, in particular across the entire surface area. Controlling the temperature across a large or even the entire surface area shall be understood to mean, e.g., controlling the temperature of the wall in such a way that the inwardly directed side of this wall encompassing the outlet can be heated by this heating device in an at least almost, for example more than 90%, ideal manner over the entire surface area, by an appropriate distribution of heating elements and/or corresponding heat conducting properties and/or a design configuration, to a temperature that is above the ambient temperature. As a result of controlling the temperature, the, for example, viscous printing ink can be conditioned, at least in the region of the outlet, preferably in a film that extends over the entire cross-section and adjoins the wall, with respect to, e.g., enhanced flowability and/or bringing the ink up to a certain temperature, for the processes in the inking unit.

The aforementioned delivery device supporting and/or effectuating the pumping-out of the printing ink is preferably configured to apply a force, which is definable and/or effectuates or at least supports the pumping-out of the ink, to the printing ink present in the ink reservoir via a drive means. Particularly advantageously, the device comprises a displacement member, to which a force can be applied via one or more drive means and by which, during the application of the force, a higher pressure compared to the ambient pressure can be applied to the printing ink accommodated in the storage receptacle. The displacement member is advantageously configured in the manner of a piston, a ram that is lowered into the interior of the storage receptacle, wherein the ram acting on the ink reservoir and the portion of the storage receptacle additionally delimiting the reserve volume can be moved relative to one another for varying the reserve volume. The displacement member can be arranged so as to be movable, and the portion of the storage receptacle additionally delimiting the ink reservoir can be fixed to a frame of the provision device or the printing or inking unit. Either by itself, or in particular together with one or more of the aforementioned variant embodiments, the displacement member can preferably be acted upon by the force that acts on the printing ink indirectly by one or more pressure medium-actuated actuators, or optionally directly by the application of pressure to a space located in the storage receptacle on its side facing away from the ink reservoir. Either by itself, or in particular together with one or more of the aforementioned variant embodiments, the wall encompassing the outlet can preferably be formed by a side of the displacement member which faces the ink reservoir, or optionally by the wall of the storage receptacle located opposite the displacement member.

Either by itself, or in particular together with one or more of the aforementioned embodiments, the metering device is advantageously configured so as to be able to set and/or provide a constant and/or continuous delivery rate R of less than 1,000 ml/min (thousand milliliters per minute), and/or the delivery device, in further particularly advantageous embodiments, between a delivery mechanism and a drive means of the metering device, comprises a gear reducer and/or a control device including control means that control by open-loop or closed-loop control the working speed of the metering device and/or a functional or tabular relationship, stored in control means, between a target value of a control variable determining the working speed of the metering device and information representing a machine speed, which, when used by the control means, allows the target value to be varied, as a function of a variable that can be supplied to the control means on the input side and represents a machine speed. The control device and the control means controlling by open-loop or closed-loop control the working speed of the metering device are connected for this purpose, in terms of signaling, to a source supplying the information about the current machine speed, which, for example, can be formed by the drive or machine controller itself, which predefines the machine speed, or by a sensor system supplying the printing substrate forward feed or the machine phase position, such as, e.g., a rotary encoder that is functionally connected to a rotating component.

In a preferred embodiment, a control variable, determining the work cycle rate of a delivery mechanism, of the delivery device, driven by a drive means and preferably configured as a metering device, can be varied by control means. In particular the control means are connected, in terms of signaling, to a sensor system comprising at least one sensor that is assigned to the ink supply chamber, by which signals that represent at least a lower limit or threshold value for the fill level having been reached, and signals that represent at least an upper limit or threshold value for the fill level having been reached, can be provided or are provided to the control means, wherein the control means preferably comprise data processing means, by which a switch into an operating mode having a higher value for the control variable, compared to the current value, is carried out when the signals that represent at least the lower limit or threshold value having been reached are registered, and a switch into an operating mode having a lower value for the control variable, compared to the previously taken-on value, is carried out when the signals that represent at least the upper limit or threshold value having been reached are registered.

The metering device is preferably configured and dimensioned so as to be able to set and/or provide a constant and/or continuous delivery rate of less than 1,000 ml/min (thousand milliliters per minute). In contrast to filling taking place in batches using larger quantities, this ensures a continuous supply, even in the case of small quantities.

Particularly advantageously, an intaglio printing unit comprising a forme cylinder and an inking unit, which comprises an inking device containing an ink supply chamber, by which a first inking unit cylinder on its outer cylindrical surface can be inked with printing ink provided in the ink supply chamber, is designed with a device for providing printing ink, which is assigned or allocated to the printing unit, and/or an assigned or allocated ink feed system, which is configured in an advantageous designed as set out above.

Such a printing unit is preferably configured as an intaglio printing unit, wherein a first inking unit cylinder, which is in particular to be inked by the inking device, on its outer cylindrical surface has recesses that correspond to individual recesses around the circumference of the forme cylinder.

In an advantageous refinement, the provision device comprising the metering device and/or the delivery device can be configured as an independent unit, i.e., a unit that is structurally separate from the printing unit, but connectible by the line to the inking device of the printing unit, and/or can be movable on rollers or wheels.

In a preferred manner for feeding intaglio printing ink to a ink supply chamber of an inking device of an intaglio printing unit, by which a first inking unit cylinder of an inking unit encompassed by the printing unit is inked on its outer cylindrical surface with printing ink provided in the ink supply chamber, the printing ink to be fed is fed from a storage receptacle, in which a supply of printing ink is kept available, to the ink supply chamber. A working speed of a metering device located in the delivery path of the printing ink and determining a feed rate is controlled by open-loop or closed-loop control by control means in such a way that, during automatic operation for the feeding of ink, a fill level in the ink supply chamber, using a sensor system supplying signals of information regarding the fill level in the ink supply, is maintained in a permitted range between an upper and a lower limit or threshold value or at a desired target fill level by varying the working speed of the metering device.

As an alternative thereto, or preferably in addition thereto, the metering device is controlled by open-loop or closed-loop control by control means in such a way that a target value for the control variable determining the working speed of the metering device is varied as a function of a variable representing a current machine speed that is decisive for the operation of the printing unit.

Either by itself, or advantageously in a refinement of the aforementioned procedure for feeding printing ink during automatic operation, in an operating sequence that is, e.g., different from the automatic feed operation, a target or starting value, which is suitable for a production operation of the printing unit, is ascertained for a control variable determining the work cycle rate of a delivery mechanism of a metering device in that, during a printing operation of the printing unit, one or more cycles are run through, which encompasses or encompass a first phase, in which the ink reservoir, in an undersupply mode, is emptied from an upper limit or threshold value for the fill level in the ink supply chamber to a lower limit or threshold value, and a, preceding or subsequent, second phase, in which the ink reservoir, in an oversupply mode, is filled from a lower limit or threshold value to the upper limit or threshold value in the ink supply chamber, as one or more such cycles are run through a measure of the number of print cycles that were run through during this time and a measure that represents the number of work cycles performed during this time period by the delivery mechanism are ascertained, and finally, taking into consideration the number of considered cycles, the measure of the number of print cycles run through during this time and the measure of the number of work cycles performed during the considered cycle or cycles by the delivery mechanism, the target or starting value for the control variable representing the work cycle rate of the metering device is determined and stored in memory means of the control device for further use.

When the relevant upper limit or threshold value is reached during ongoing operation of the printing unit, a switch is made, e.g., for the duration of the first phase, into an idle mode of the provision device, in which the metering device is at idle, and, when the lower limit or threshold value is reached, a switch is made for the second phase into an oversupply mode, in which more printing ink is delivered to the ink reservoir than is consumed by the transfer of printing ink from the ink reservoir downstream to the inking unit.

BRIEF DESCRIPTION OF THE DRAWINGS

Exemplary embodiments of the invention are illustrated in the drawings and will be described in greater detail below. The drawings show.

DETAILED DESCRIPTION

Figure 1:
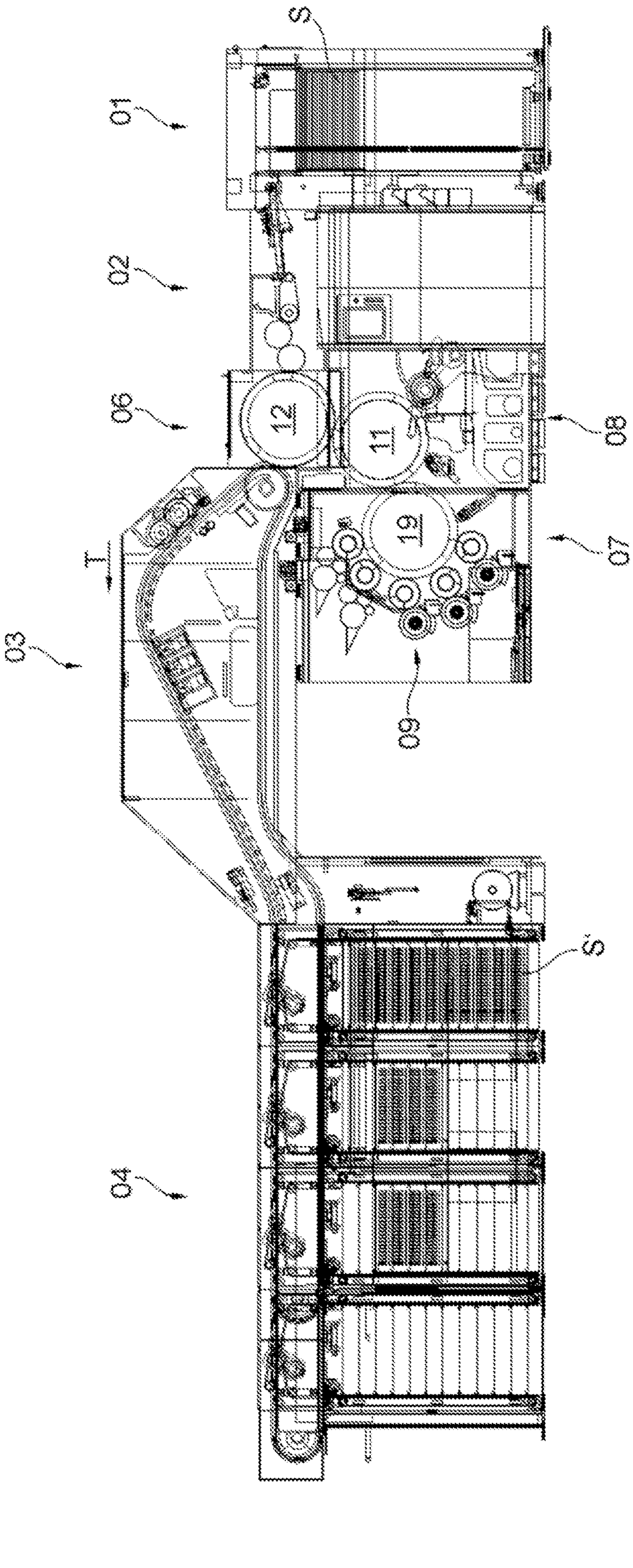
FIG. 1 a side view of a printing press, in particular a gravure printing press, comprising a printing unit.
Figure 2:
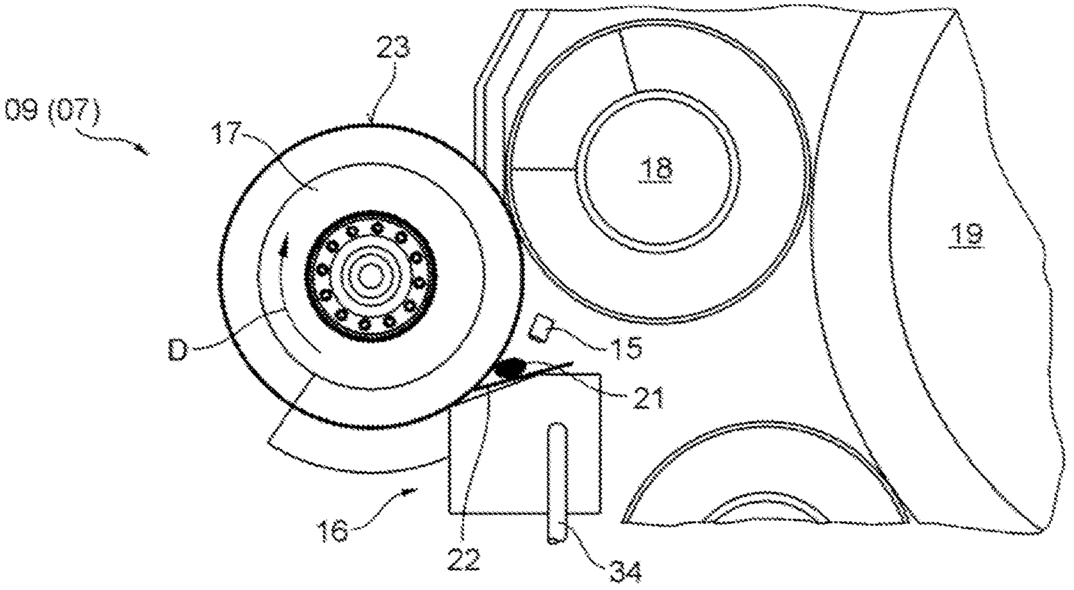
FIG. 2 an inking train from an inking unit of a printing unit from FIG. 1.

A printing press, in particular a security printing press, comprises at least one printing unit 06, by which substrate S can be printed according to a gravure printing method, in particular an intaglio printing method, for example a substrate infeed 01, for example configured as a sheet feeder 01, by which the substrate S to be printed can be fed to the printing press on the input side, a first conveyor line 02 by which the substrate S can be fed, optionally via further processing units, to the at least one printing unit 06, in particular an intaglio printing unit 06, a product receiving unit 04, configured, for example, as a delivery 04, in particular a pile delivery 04, by which the substrate S' that has been printed on at least one side can be combined into bundles, and a second conveyor line 03 by which the printed substrate S' can be fed, optionally via additional processing units, to the product receiving unit 04. Even though the substrate S; S' can also be present in web format, it is preferably present in the form of a substrate sheet S; S', for example a printing substrate sheet S; S', and is preferably formed of polymer-based security paper, for example banknote paper.

The printing press printing in particular according to the intaglio printing method, in particular the gravure or intaglio printing press, is preferably configured as a sheet-fed printing press, in particular as a sheet-fed gravure printing press, and preferably as a sheet-fed printing press printing according to the intaglio printing method. The intaglio printing process is a gravure printing process that is preferably used during the industrial production of banknotes, security documents, or security elements. High contact pressure, for example line pressure with, for example, more than 1,000 N/cm, is used in the printing nip, by which the substrate S during printing is simultaneously embossed in such a way that the generated structure can be perceived in a tactile manner.

Figure 3:
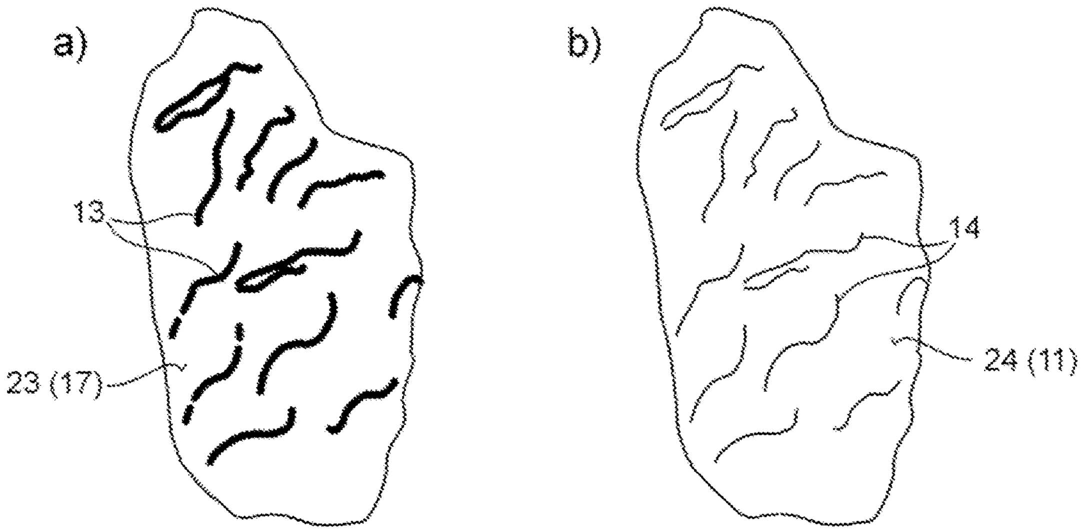
FIG. 3 a schematic illustration a) of engravings in the outer cylindrical surface of a first inking unit cylinder and b) of engravings in the outer cylindrical surface of a forme cylinder.
Figure 4:
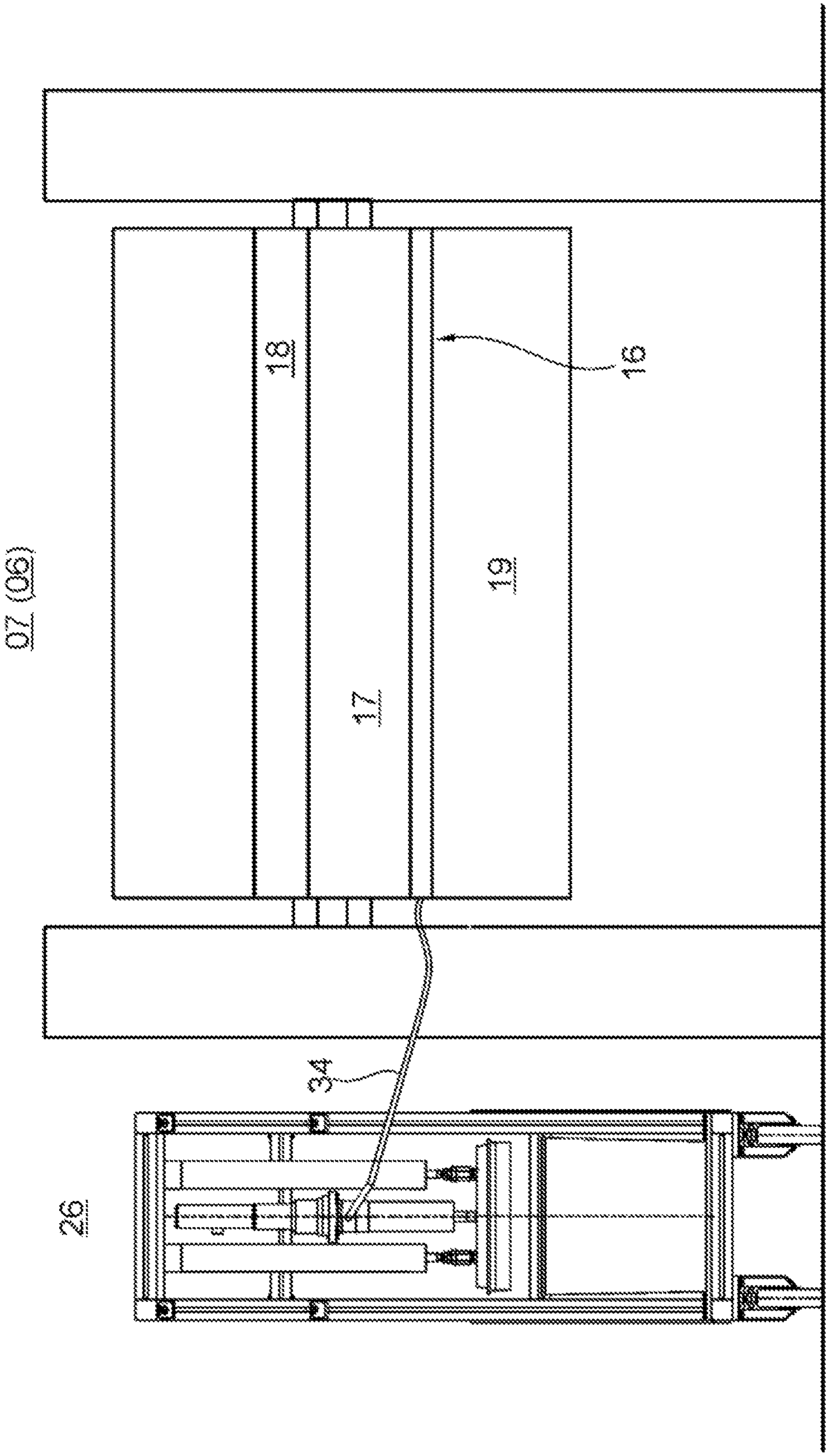
FIG. 4 a schematic rear view of an inking unit comprising, for the sake of a better understanding, only one shown inking train and an assigned provision device.

The printing unit 06 operating according to a gravure printing method, in particular an intaglio printing method, hereafter also referred to as gravure printing unit 06, in particular as recess printing unit 06 or intaglio printing unit 06, comprises, for example, a printing unit cylinder 12, also acting and/or referred to as an impression cylinder 12, and a printing unit cylinder 11 that forms a printing nip with the impression cylinder 12 and is embodied as a forme cylinder 11 for gravure printing, in particular an intaglio printing cylinder 11, wherein the impression cylinder 12 and the forme cylinder 11 preferably are or at least can be thrown onto one another under high pressure. On its circumference, the forme cylinder 11 carries a pattern of print image-producing recesses 14 (see, for example, FIG. 3 *b*)) of a print image to be printed, for example motif, hereafter also referred to synonymously, where not explicitly otherwise specified, as "engravings" 14, regardless of their method of production. The recesses 14 can generally be provided on an outer cylindrical surface 24 encompassed by the cylinder outer circumferential surface or, in a preferred embodiment, on the outer cylindrical surface 24 of one or more printing formes that are detachably arranged or can be detachably arranged on the forme cylinder 11, for example as a printing plate or optionally as a printing forme sheath.

Preferably, the printing unit 06 or the printing press for printing the substrate S, in particular the substrate sheet S, is configured with multiple copies. The overall image applied to a printing length or repeat length and/or assigned to a substrate sheet S; S' or substrate section S; S' is preferably formed by the print images of a plurality of copies, e.g., banknotes, to be printed in multiple columns side by side and in multiple rows one after another onto the substrate S. The engraving pattern of a printing forme assigned to the printing length is therefore formed by a corresponding multiplicity of patterns of recesses 14, e.g., motif engravings, in particular with the identical motif, arranged in matrix form in columns and rows. It is also possible for multiple such image motifs, spatially separated from one another, to be provided per copy. The forme cylinder 11 can have a multiple-size, in particular triple-size, design i.e., having an appropriate circumference and optionally holding devices configured to print multiple, in particular three, substrate sheets S or sections of a web during one revolution.

To remove excess ink 21, in particular printing ink 21, a removal device, which is not denoted here, e.g., a wiping device comprising a wiping cylinder, is or at least can be set against the forme cylinder 11.

The forme cylinder 11 or a printing forme provided thereon can be inked with one color, or preferably with multiple colors, by an inking unit 07. This inking unit 07 can be mounted so as to be movable as a whole or in sections away from the preferably stationary printing unit part 08, which comprises the printing unit cylinders 11; 12 that form the printing nip, and/or can even be configured as separable therefrom.

The inking unit 07 comprises, at the upstream end as viewed in the direction of ink transport within the inking unit 07, an inking device 16, which is or can be supplied with printing ink 21 by an ink feed system, for example, and by which a, for example first, inking unit cylinder 17, hereafter also referred to as a gravure inking cylinder 17, can be inked. This cylinder comprises recesses 13 (see, e.g. FIG. 3 *a*)) in the region of its outer cylindrical surface 23, hereafter also referred to synonymously, where not explicitly specified, as "engravings" 13, regardless of their method of production, which correspond to the, or some of the, recesses 14 or engravings 14 on the outer cylindrical surface 24 of the forme cylinder 11 or of the printing forme carried thereby (see, e.g., FIG. 3 *b*)). This does not mean that these must have the same dimensions and the same depth as the corresponding engravings 14, but that their shape and/or depth are in a defined relationship to one another that is obtained, for example, based on regularities that are established or are to be established. Individual recesses 13 on the first inking unit cylinder 17 preferably correspond to recesses 14 on the forme cylinder 11 in such a way that their shape and/or depth are in a defined relationship to the recesses 14 on the forme cylinder 11 which is subject to established regularities and/or in such a way that individual recesses 13 on the first gravure inking cylinder 17 have a size that is scaled by way of a defined regularity and/or a shape in relation to individual corresponding recesses 14 on the forme cylinder 11. For engravings 13 on the first inking unit cylinder 17, a greater width, e.g., line width, and/or a greater depth are preferably provided than for the corresponding engravings 14 on the forme cylinder 11 or on the printing forme comprised or carried by the same. Individual, in particular line-shaped, recesses 13 on the first inking unit cylinder 17 which correspond to recesses 14 on the forme cylinder 11, for example, have a width of, e.g., at least 20 μm and/or no more than 1,000 μm. The term "linear" or "line-shaped" shall be understood to refer not only to lines that have narrow line widths, but also to strip-like lines having greater line widths or varying line widths, with a greatest length in particular in each case being significantly greater, e.g., at least twice or preferably at least four times or even ten times as large as a width of the line having a constant line width or a largest width of a line having a varying width.

Downstream from the gravure inking cylinder 17 in the inking unit 07, an inking unit cylinder 18, e.g., a second inking unit cylinder, to be inked thereby is provided, which transfers the printing ink 21 from the gravure inking cylinder 17 to downstream and, in an advantageous embodiment, includes, in the region of its—preferably elastic and/or compressible—outer cylindrical surface, elevations separated from one another by deeper points or areas, so as to cooperate in the region of these elevations with the outer cylindrical surface of a next inking unit cylinder or printing unit cylinder 19; 11 downstream. The latter can be the forme cylinder 11 or, in an advantageous embodiment, a transfer cylinder or in particular an ink collecting cylinder 19. In the case of the ink collecting cylinder 19, this cylinder cooperates upstream with second inking unit cylinders 18 of several inking units 09, e.g., inking trains 09, which each comprise an inking device 16 and a first and second inking unit cylinder 17; 18.

By means of the aforementioned inking device 16, this first inking unit cylinder 17 can be inked at least at an application point located on its circumference. Even though the application at the application point can generally be arbitrarily designed, the inking device 16, in a preferred embodiment, comprises an ink supply chamber, which is at least partially delimited on the side facing the gravure inking cylinder 17 by the outer cylindrical surface 17 thereof. The ink supply chamber here shall be understood, e.g., in general, to mean the open or closed space in which the printing ink 21 to be applied, which is in contact with the outer cylindrical surface 17, is located. In a preferred embodiment, at least one sensor device comprising at least one sensor 15 is assigned to the inking device 16, by which a measure of the amount of ink and/or fill height, hereafter also referred to as fill level L, present in the ink supply chamber can be derived, at least, however, information about when at least one critical fill level is reached, e.g., at least one critical value L1, $L_{max}$; L2; L0 for the fill level L, in particular a lower and/or upper limit or threshold value L1, $L_{max}$; L2; L0 for the fill level L.

On at least the downstream side of the aforementioned application point in the operating direction of rotation D of the inking unit cylinder 17 including the recesses 13, the inking device 16 comprises a retaining means 22, e.g., an ink blade 22 or in particular wiping means 22, such as, e.g., a doctor blade 22, by means of which, as viewed in the operating direction of rotation D, downstream from the ink application, and in particular upstream from a nip point with the downstream inking unit cylinder 18, printing ink 21 that was previously applied to the outer cylindrical surface 23 can be removed. Preferably, the retaining means 22 is designed in the form of a wiping means 22, in particular a doctor blade 22, the contact force of which is preferably variable or adjustable and which is in physical contact with the preferably hard and unyielding outer cylindrical surface 23 of the gravure inking cylinder 17, at least in the working or operating position, and which can be used to remove, in particular essentially completely, printing ink 21 that has been applied to non-engraved regions.

The above-described design of the first inking unit cylinder 17 including recesses 13 that correspond to recesses 14 on the forme cylinder 11 makes ink infeed into the inking unit 07 possible in a locally metered manner as needed, hereafter also referred to as selective ink infeed, without having to introduce printing ink 21 across a large area and remove larger amounts thereof again by means of the wiping device. However, this also means that, during operation, considerably less printing ink 21 is removed from the inking device 16 than is otherwise customary. A considerable improvement during the operation of such a printing unit 06 having selective ink infeed can now be achieved by an ink feed system and/or method for feeding ink as described below. In this way, printing ink 21 can be fed as needed over time, which makes it possible to keep a small quantity of printing ink 21 available in the ink supply chamber, with a shorter mean residence time. This, in turn, results in lower thermal loading of the printing ink 21 due to heat-induced evaporation of liquid solvent contained therein, and thus in an operation that is less prone to disruptions.

The ink feed system comprises a device for the provision 26 of printing ink 21, provision device 26 for short, from which printing ink 21 can be fed to the inking unit 07 of a printing unit 06, in particular the inking device 16 or its supply chamber, for example via at least one line 34, e.g., a feed line 34. The provision device 26 can be integrated into the inking unit 07 or an assembly thereof, or be configured as an independent unit, and can be connected or connectible via the line 34, which can preferably be disconnected at least at one location of the line path, to the inking device 16 or an outlet leading into the ink supply chamber. In both instances, a line 34 that is configured, e.g., as a pipe or hose line and preferably detachable in the region of at least one end, is provided, e.g., in the line path, in contrast to, for example, merely passing through between chambers of an inking device 16. In an advantageous refinement, the provision device 26 is configured as an independent unit and, for example, can additionally be moved on rollers 35 or wheels 35.

The provision device 26 is in particular configured as a supply and metering device 26 for the, in particular volumetrically, metered or meterable feeding of printing ink 21, by which printing ink 21 can be kept available in an ink reservoir 25 and, e.g., can be provided or is provided in a metered manner on the output side of a delivery device 27, which is encompassed by the provision device 26 and configured as a metering device 27, so as to be fed into the inking device 16. In principle, the metering, that is, the feeding according to a desired feed rate R, can be determinable with respect to any control variable n that relates to the mass flow or volume flow and correlates therewith via a defined, in particular linear relationship. Preferably, however, a metering device 27 that can be determined with respect to the volume delivery rate, e.g., a volumetric metering device 27, is provided with, e.g., a volumetrically operating delivery mechanism 29, such as, for example, a volumetric pump 29, in particular a volumetric metering pump 29. The volume delivery rate determining the feed rate R can be determinable or predefinable by way of any suitable control variable n that is strictly correlated with the volume delivery rate, in particular by way of an operating variable of the metering device 27 that determines the volume delivery rate. In a preferred embodiment, a control variable n representing the working speed of the metering device 27, e.g., a variable representing the work cycle rate, such as, for example, the working clock rate or the working speed of the delivery mechanism 29, can be used as the control variable n for controlling the delivery rate, and thus the feed rate R. In particular, a drive means 28 driving the delivery mechanism 29, in particular a drive motor 28, serving as a final control element 28, can be controllable by open-loop or closed-loop control, or can be controlled by open-loop or closed-loop control, with respect to a control variable representing and/or determining the feed rate R or volume delivery rate, and thus representing the working speed, e.g., with respect to an operating speed n of a drive means 28 driving the delivery mechanism 29, such as e.g., an operating clock rate n of a pressure medium-based piston-cylinder system, or in particular with respect to an operating speed n of a drive motor 28 driving the delivery mechanism 29.

In the case of a metering device 27 that is discontinuously operated during the feed operation of the provision device 26, i.e., in an active feed operation, such a feed rate R or volume delivery rate, or a control variable n representing the same, for example when the displacement of a delivery mechanism 29, configured, e.g., as a piston pump, is known, can be determinable or pre-definable by the work cycle rate, i.e., the number of work cycles based on a time period during operation. This can, for example, be the cycle rate of the drive means 28 encompassed by the metering device 27 for driving the same, in this case, e.g., a displacement piston in a cylinder-piston system.

Figure 5:
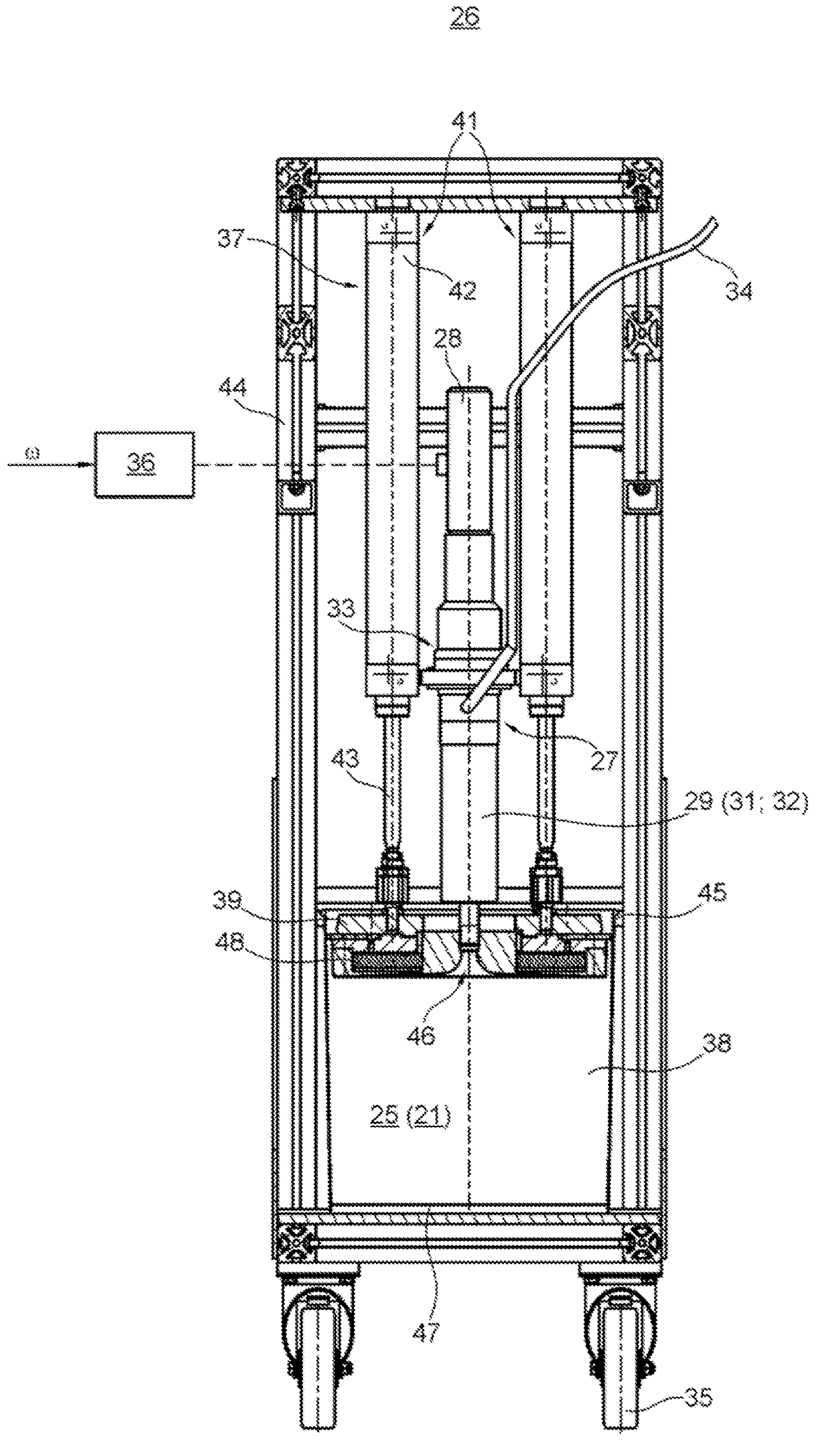
FIG. 5 an enlarged illustration of the provision device from FIG. 4.
Figure 6:
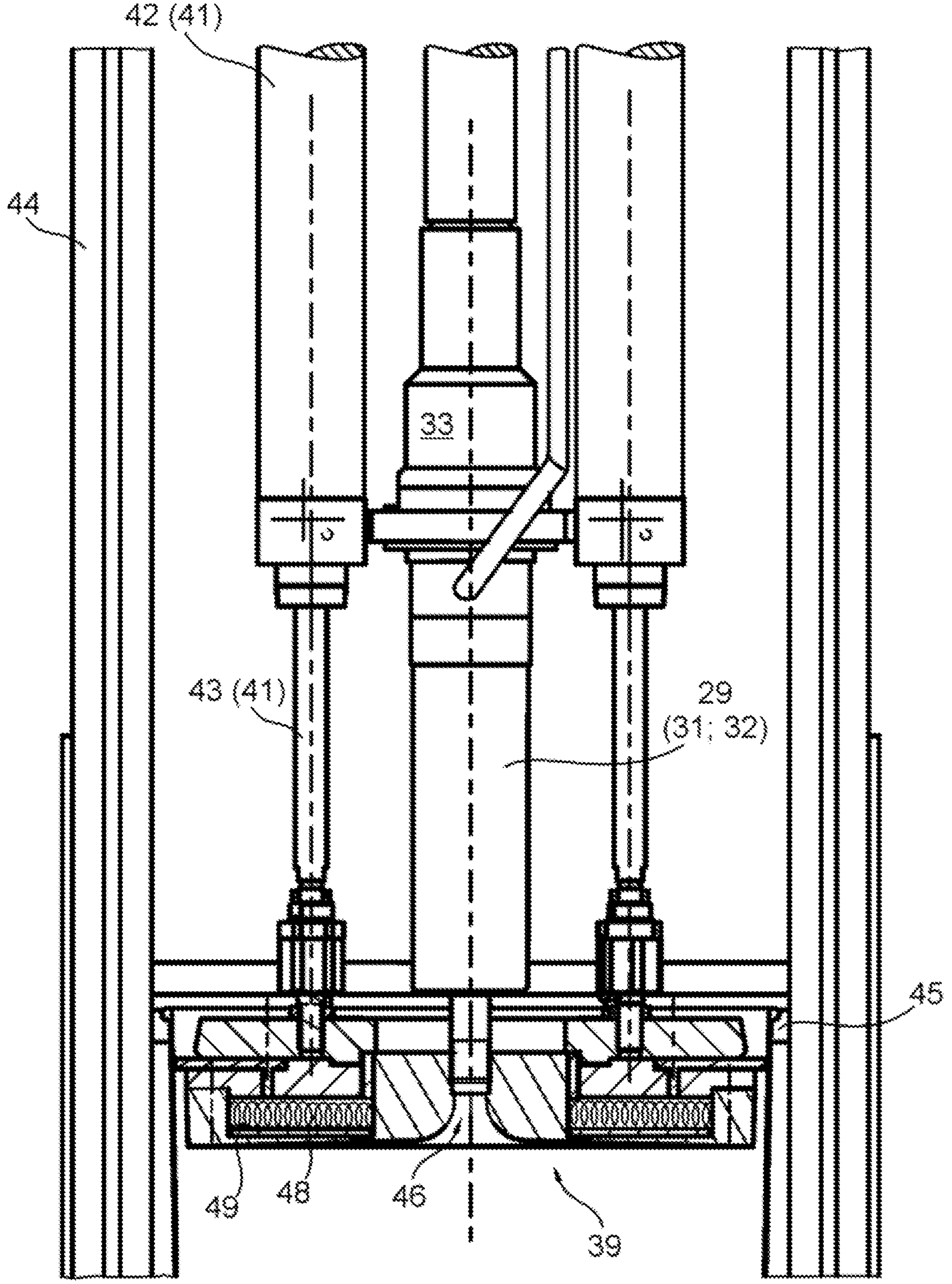
FIG. 6 an enlarged detail of the provision device from FIG. 5.

However, a metering device 27 that, during the operating mode, i.e., during the active feed operation, delivers the printing ink 21 continuously, i.e., in a continuous delivery flow without interruptions, is to be preferred, such as exists, for example, by a rotatably operating delivery mechanism 29, e.g., a rotatably operating volumetric pump 29, in particular a rotatably operating displacement pump 29. For example, when a delivery volume $V_Z$ is known for a defined work cycle, e.g., a revolution or a fixed portion or a multiple thereof, the continuous feed rate R or volume delivery rate per work cycle here as well can be determinable or predefinable by a control variable n representing the work speed, in particular the work cycle rate of the metering device 27. The working speed can be expressed, for example, by an operating speed n, rotational speed n for short, of the drive means 28 encompassed by the metering device 27 for driving the same, e.g. drive motor 28. The drive means 28, preferably by way or a gear mechanism 33, e.g., a moving or movable part 32, which is only hinted at in FIG. 5 by parentheses, in particular a rotor 32, drives the delivery mechanism 29 effectuating the delivery. For the case of closed-loop angular position controllable drive means 28, the term of the operating speed n shall simultaneously encompass the resulting angular velocity. Likewise, the term of the operating speed n determining the delivery rate shall, in the broader sense, also encompass embodiments in which it is not the rotational speed at the drive means 28 or its rotor 32 itself that is used, but one that is optionally derived in another manner in the drive train and strictly correlates with the operating speed n of the drive motor 28 and/or of the rotor 32, and is used for determining and controlling the feed rate R or delivery rate.

In a particularly suitable embodiment for fluid having high viscosity, such as is present, e.g., in the case of printing ink 21 for intaglio printing, the delivery mechanism of the metering device 27 is configured as a screw pump 29, and in particular as an eccentric screw pump 29. This pump comprises, as a stationary part 31 only hinted at in FIG. 5 by parentheses, a stator 31 having, e.g., an internal thread, in which, e.g., a rotor 32 can be rotated or is rotated as the moving part 32 driven by the drive means 28.

The, optionally discontinuously or preferably continuously operating, metering device 27 is preferably configured so as to be able to set an, in particular constant and/or continuous, delivery rate R of less than 1,000 ml/min (thousand milliliters per minute), in particular less than 500 ml/min (five hundred milliliters per minute), or even less than 200 ml/min (two hundred milliliters per minute). This delivery rate R can optionally be discontinuously effectuated or effectuatable, for example in several strokes per minute, or preferably continuously by a constant delivery rate, the level of which optionally varies intermittently. Such low and in particular continuous delivery rates R can be achieved by a delivery mechanism 29 having an accordingly small working volume and/or by drive means 28 that can be operated at an accordingly low working speed, for example cycle rate or rotational speed. Instead or in addition, in a preferred embodiment, a gear mechanism 33, in particular a gear reducer 33, is provided between the drive means 28 and the moving or movable part 32 of the delivery mechanism 29, by which a higher operating speed n of the drive motor 28 is or can be reduced to a lower effective rotational speed, or possibly a smaller work cycle of the movable part 32 of the delivery mechanism 29.

For example, the displacement pump 29, configured, e.g., as an eccentric screw pump 29, is configured with a geometrically induced volume delivery rate of 2 to 6 ml/UR (milliliters per revolution of the rotor 32), in particular 3 to 5 ml/UR (milliliters per revolution of the rotor 32), and a gear mechanism 33 having, e.g., a gear ratio between its driving side and driven side, i.e., between the input and output, of 50:1 to 30:1, preferably 40:1, is provided in the drive train between the rotor 32 and drive motor 28. For a volume delivery rate of, e.g., 4 ml/UR (milliliters per revolution of the rotor 32) and a gear reducer 33 having a gear ratio of 40:1, this means then, for example, a drive motor-based volume delivery rate of 0.1 ml/UM (milliliters per revolution of the drive motor 28).

The drive motor 28 is configured so as to be controllable by open-loop or closed-loop control with respect to its rotational speed or angular velocity, and can be controlled by open-loop or closed-loop control by control means of a control device 36, which is only schematically hinted at here, with respect to its working speed or angular velocity. The drive motor 28 or the control means controlling the same can receive the target specification from higher-level control means, which form and provide the target specification for the control variable n, in particular the operating speed n, in at least one operating mode A, in particular an automatic mode A, preferably using information representing a current machine speed ω, in particular production speed ω. The control means encompassed by the schematically depicted control device 36 can be physically provided or implemented at any arbitrary location of the printing press or its control system, centrally at one location or distributed in various locations of the control system, but are connected in terms of signaling to the drive means 28 or its drive controller.

In a particularly advantageous embodiment, the provision device 26 comprises a delivery device 37, which supports and/or effectuates the delivery of the printing ink 21 from an ink reservoir 25, e.g., from a storage receptacle 38 accommodating printing ink 21, and by which a force effectuating or at least supporting the delivery, in particular having a higher pressure compared to the ambient pressure, can be applied to the printing ink 21 present in the ink reservoir 25. Such a delivery device 37 can generally be provided independently of the presence of an above-described metering device 27, however is preferably encompassed by the provision device 26 in conjunction with and in addition to such a metering device 27, so as to reduce the need for the metering device 27 used for metering to provide high delivery forces. Ideally, the delivery device 37 is operated in such a way that no or at least no considerable pressure difference, i.e., for example, no more than 10% of the pressure present at the input side, exists between the input and output of a possibly provided metering device 27.

So as to apply the force effectuating or at least supporting the delivery of the printing ink 21 present in the ink reservoir 25, any displacement-based, or preferably force-based, delivery device 37 can generally be provided, by which a force, which can in particular be set and/or maintained at a constant level, can be applied in such a way to the printing ink 21 of the ink reservoir 25 that a higher pressure compared to the ambient pressure arises in the printing ink 21. The ink reservoir 25 is then emptied, or the printing ink 21 is then pumped out, in particular by pressure application. This can generally take place directly by applying, for example, a gas or gas mixture column that is under overpressure to a space above the ink reservoir 25 in the storage receptacle 38, or preferably indirectly by way of a displacement member 39, which is encompassed by the delivery device 37 and, upon actuation of a force acting thereon, in particular of a final control element 41 acting thereon, in particular a drive means 41, exerts pressure on the volume taken up by the printing ink 21 in the storage receptacle 38.

The displacement member 39 can be configured as a bellows or air cushion provided in the storage receptacle 38, the volume of which can be increased by having a pressure medium applied thereto by a pressure medium supply effective as a drive means 41.

In a preferred embodiment, the displacement member 39, however, is provided by a ram 39, which, e.g., is lowered into the interior of the storage receptacle 38 in the manner of a piston. The ram 39 acting on the ink reservoir 25 and the part of the storage receptacle 38 that additionally delimits the reserve volume can be moved relative to one another so as to vary the reserve volume, wherein preferably the ram 39 is configured so as to be movable, and the part of the storage receptacle 38 additionally delimiting the ink reservoir 25 is configured so as to be fixed to the frame, with respect to the provision device 26. However, conversely, the ram 39 can also be fixed, and the part of the storage receptacle 38 surrounding the ink reservoir 25 can be movable. The ram 39 forms a wall 39 delimiting the supply chamber, for example. A seal 45 is preferably provided between the part of the storage receptacle 38 delimiting the ink reservoir 25 and the ram 39, which, despite the relative movability, seals the interior space accommodating the ink reservoir 25 to prevent the printing ink 21 from leaking into the surrounding area.

Even though a drive means 41 pressing the ram 39 against the ink reservoir 25 can generally be configured in a displacement-based manner by a displacement-controlled drive, in a preferred embodiment it is formed by a force-controlled, for example pressure medium-actuated, actuator 41, e.g., by at least one cylinder-piston system 41 to which pressurized fluid, for example compressed air or pressurized liquid, such as oil, can be supplied. One of the two parts, e.g., the part effective as a cylinder 42 (38), is fixed to and supported on a frame 44 of the provision device 26 or of the inking unit 07 comprising the provision device 26, and the other part, e.g., the part effective as a piston 43 (39), is connected to the ram 39 or, in one variant, forms such a piston, or optionally also vice versa.

In the variant indicated by parentheses, the cylinder-piston system 41 is, for example, formed by the ram 39 effective as a piston 39, which, by means of pressurization of a space that is delimited by a side of the ram 39 facing away from the ink reservoir 25, the inner wall of the storage receptacle 38 and a cover, which is not shown here, can be pressed in the storage receptacle 38 effective as the cylinder 38 with a force against the ink reservoir 25.

In an advantageous refinement, several aforementioned actuators 41 acting on the ram 39 are provided.

As a result of a delivery device 37 applying a force, in particular in a pressure-controlled manner, onto the printing ink 21 kept available in the ink reservoir 25, a, preferably constant and/or defined, overpressure can be applied to and/or maintained in the ink reservoir 25, which is used to uniformly deliver the printing ink 21 and reduces the load on a possibly provided metering device 27.

Ideally, the pressure that is exerted by the cylinder-piston system 41 on the ink reservoir 25 is selected in such a way that no, or within the above meaning at least no, considerable, pressure difference exists between the input and output of a possibly provided metering device 27. The ink reservoir 25 is emptied, e.g., essentially by the delivery device 37 by means of force or pressure application, while the delivery rate R determining the feed rate R is determined by the metering device 27, e.g., in a substantially no-load manner. The force or the pressure to be applied to the actuator 41 can preferably be variable or settable, at least within an adjustment range relevant for the delivery pressure.

Figure 7:
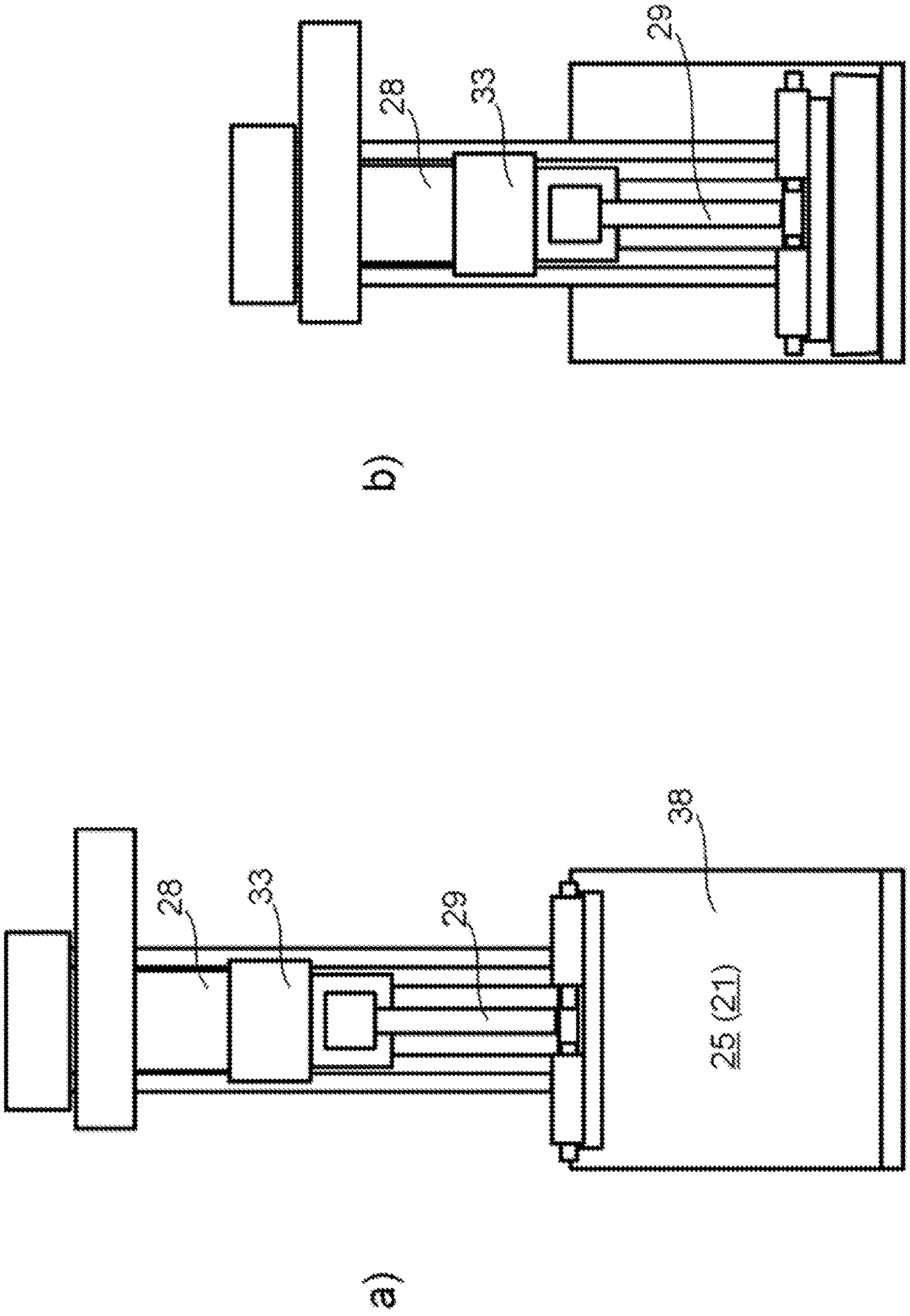
FIG. 7 a schematic illustration of the provision device a) having a full and b) having a substantially empty ink reservoir.

An outlet 46 for the printing ink 21 from the storage receptacle 38 can generally be provided in the ram 39 or in the part surrounding the ink reservoir 25 of the storage receptacle 38, in particular in a wall 47 of the storage receptacle located opposite the ram 39. In an advantageous embodiment shown here, the outlet 46 is provided in the ram 39, which, for applying the pressure to the printing ink 21 necessary for delivery, is increasingly pressed by the drive means 41, preferably downwardly, into the storage receptacle 38 that is fixed to the frame and accommodates the ink reservoir 25 (see, e.g., FIG. 7 *a*) and FIG. 7 *b*)).

In an embodiment of the provision device 26 that is already particularly advantageous by itself, but preferably together with one or more of the aforementioned advantageous embodiment features, the wall 39; 47, encompassing the outlet 46, of the part structure delimiting the space for the ink reservoir 25 can be heated, in particular temperature-controllable and/or temperature-regulatable, for example to a temperature above 30° C., on at least the side facing the ink reservoir 25. For this purpose, a heating device 48 is provided in or on this wall 39; 47 and, in a preferred embodiment, at least one sensor 49 is provided, for ascertaining the temperature present at the relevant measuring location. In an embodiment that is particularly energy-saving and/or gentle on the printing ink 21, only the wall 39; 47 of the receptacle that encompasses the outlet 46 can be heated, in particular temperature-controlled and/or temperature-regulated.

The heating device 48 is preferably configured as an electrical heater 48, in particular as an electrical resistance heater comprising one or more electrical heating elements provided, e.g., in or on the relevant wall 39; 47, e.g., one or more heating loop or heating coils. As an alternative, it can optionally also be formed by flow spaces or channels through which heating or temperature control fluid can flow or flows.

The heating device 48 is preferably configured in such a way, i.e., configured with corresponding heating elements and/or connected to such an electrical power source, that, under normal ambient conditions of 20° C. and 1,013 h Pa, a temperature of at least up to 60° C., and preferably at least up to 70° C., can be achieved in the region of at least a portion of the inner side of the relevant wall 39; 47. One or preferably more sensors 49 for ascertaining the temperature is or are preferably located in a region of the wall 39; 47 between the heating device 48 and the wall side facing the ink reservoir 25. Preferably, multiple heating elements and/or sensors 49 are distributed over the wall surface. In a preferred embodiment, the heating device 48 can be controlled with respect to the heat output, in particular can be controlled by closed-loop control with respect to a measured temperature in a control loop including the heating device 48 and the at least one sensor 49 toward a, preferably variable, target value. In this way, for example, the flow behavior, and thus the delivery behavior, can be varied by way of the temperature dependence of the viscosity and/or can be adapted to different ink compositions.

In a particularly advantageous refinement of one or more of the aforementioned embodiments and variant embodiments, the line 34 leading to the ink supply can be heated, in particular temperature-controlled and/or temperature-regulated, over at least a portion of its length. For this purpose, a, for example inductively effective, heating device is provided, e.g., in or on the wall and, in a preferred variant, at least one sensor is provided, for ascertaining the temperature present at the relevant measuring location. A wall temperature present in the interior of the line 34 in a heated section is, for example, between 35° C. and 45° C., and preferably 40±2° C.

Of very particular advantage is an embodiment of the ink feed system in which the ink supply works in a consumption-dependent or fill level-dependent manner, or can be operated or is operated in a consumption-controlled or fill level-controlled manner, as a result of the provision device 26. The consumption or the fill level L is monitored by one or more of the aforementioned sensors 15 and is maintained, for example in a computer-controlled manner, between two values L1; $L_{max}$; L2; L0, e.g., limit values or in particular threshold values L1; $L_{max}$; L2; L0 or, possibly taking a tolerance on either side into consideration, is adjusted to a target value $L_S$ for the fill level L.

Particularly advantageous is an embodiment in which a predefined working speed of the metering device 27 or of the drive means 28 driving the delivery mechanism 29 is correlated with the machine or production speed w and varies or is varied as a function thereof.

In an embodiment of the ink feed system that is already preferred by itself, but preferably together with one or more of the aforementioned advantageous embodiment features of the provision device 26, this system can be operated in automatic mode A in at least one operating mode A and, in addition to an aforementioned provision device 26 and the line 34 leading to the ink supply chamber of the inking device 16, comprises the sensor system, including the at least one aforementioned sensor 15 monitoring the fill level, and control means, encompassed by the control device 36 or connected thereto in terms of signaling, in particular data processing means encompassed by the control means, including program routines implemented there, which are configured, using signals of the at least one sensor 15 which relate to the fill level L, to determine a target specification for the control variable n or information containing the target specification, in particular a target value specification for an operating speed n, in particular an operating speed n or information containing the same, and to output this to the final control element 28; 41 determining the delivery rate R or operating speed n, in particular to a drive controller of the drive means 28; 41 of the provision device 26, in particular the metering device 27, which is used to deliver and/or meter the printing ink 21 to be fed. The determination of the target specification for the control variable n can be to select one of multiple operating modes I; II; III having different values $n_S$; $n_H$; $n_L$; $n_0$ and/or to implement therein the aforementioned correlation with the machine or production speed ω.

In a first embodiment described in more detail hereafter for an automatic operation of the ink feed system, i.e., the automatic mode A, the at least one sensor 15 and the data processing means, or the program routines implemented there, are configured to maintain the fill level L, during operation, in a permitted range between an upper and a lower value L1; $L_{max}$; L2; L0, e.g., limit or threshold value L1; $L_{max}$; L2; L0, or, if possibly the level is exceeded or fallen short of, to return the fill level to this range.

They are in particular configured to monitor the fill level L for a lower and upper limit or threshold value L1; $L_{max}$; L2; L0 and, when the limit or threshold value L1; $L_{max}$; L2; L0 is reached, to switch between a first operating mode I, i.e., nominal operation I, in which the final control element 28; 41 is operated in a nominal operating state, which is a steady state at least at a constant machine or production speed ω, at a nominal operating speed, which is constant at least at a constant machine or production speed ω, or a first value $n_S$, which is constant at least at a constant machine and operating speed ω, for the control variable n, e.g., the target value $n_S$, in particular at a constant target rotational speed $n_S$, and an operating mode II; III that is different therefrom, in which the final control element 28 (41) is operated at a defined value $n_H$, which counters the departure from the permitted range, for the control variable n, in particular the operating speed n. The aforementioned target value $n_S$ serves as the target specification for the final control element 28 (41) and shall hereafter, in particular, however, not just in connection with a control loop for the control variable n, also be understood within the meaning of a target value $n_S$, representing a nominal value $n_S$ for the specification of a relevant control variable n in a pure control chain and/or to be replaced by the same.

The nominal or target value $n_S$ is based on a consumption value to be expected for the printing ink 21, which, for example, is determined by calculation or empirically, or, in a second embodiment, is found by an adjustment to a stable target value $L_S$, except for possibly present tolerances, for the fill level L by variation of the target value $n_S$. Examples for obtaining the value by calculation or empirically and possibly required modifications are described below.

Regardless of the type of determination, in a preferred embodiment not only a single fixed target value $n_S$ is used, but a target value $n_S$ that varies with the current machine or production speed ω. A corresponding, for example functional or tabular, relationship is stored in the control means, for example. This takes into account the fact that the consumption of printing ink 21 varies with the machine or production speed ω.

In an embodiment to be particularly preferred, in addition to the first operating mode I related to the operation of the final control element 28 (41) using the target value $n_S$ for the control variable n, an operating mode II having a value $n_H$ for the control variable n determining the delivery speed, in particular operating speed n, is provided which is greater or higher compared to the target value $n_S$, meaning higher or increased, e.g., by at least 20% or preferably at least 50% of the target value $n_S$ that is relevant, e.g., for the current machine and production speed ω. This operating mode II is employed as an oversupply mode II having, e.g., a significantly, e.g., at least 20% or even 50%, higher delivery rate R or operating speed, for example during the initial filling of the ink supply and/or, in an advantageous embodiment, when, during operation, e.g. during nominal operation I, the fill level L drops from a higher level, and a lower limit value, or preferably threshold value, L2; L0 for the fill level L has been or is reached.

In addition to the nominal operation I having the first value $n_S$, this being the target value $n_S$, in a further operating mode III a value $n_L$ is preferably provided which is smaller or lower compared to the target value $n_S$, meaning lower, e.g., by at least 20% or preferably at least 50% of the target value $n_S$ that is relevant, e.g., for the current machine or production speed ω, and which specifically can also take on the value "zero" no (i.e., in particular operating speed n=0) (i.e., $n=n_L=n_0$). Such a value "zero" $n_0$, i.e., $n_L$ or $n_L=n_0$, is used in particular for an operating mode III, e.g., an undersupply mode III, to which a switch is to be made when a maximum permissible limit value $L_{max}$ for the fill level L has been reached or exceeded, or which is to be maintained when an at least maximum permissible value $L_{max}$ is present, for example so as to lower the fill level L during further operation into a permitted range, e.g., to the upper threshold value L1. The operating mode III representing an undersupply mode III thus, e.g., specifically also includes an idle mode III, in which the final control element 28 (41) determining the delivery rate is not operating, that is, is switched off. Such a switch between the operating modes I; III thus also constitutes a change or, e.g., when taking place at larger intervals, a variation of the working speed or the target value $n_S$ related thereto.

The value "zero" no for the control variable n representing the working speed, that is, $n_L=n_0=0$, can then be used, instead or in addition, when, due to the absence of operational readiness, an ink infeed into the inking device 16 is to be completely suspended. Such an operational readiness can then be checked by reviewing one or more pieces of operating data and/or parameters $P_i$ regarding a configuration, e.g. operating and/or machine parameters $P_i$. One or more such parameters $P_i$ can, for example, relate to a release signal for the automatic mode A and/or the operational readiness of the inking device 16, in particular the assumption of the working position of the retaining means 22 and/or the presence of a minimum machine speed.

The ink feed system can preferably be operated in automatic mode A and, in addition to an aforementioned provision device 26 and the line 34 leading into the ink supply chamber of the inking device 16, comprises the at least one aforementioned sensor 15, monitoring the fill level, and data processing means, encompassed by the control device 36 or connected thereto in terms of signaling, including a program implemented there which, using signals of the at least one sensor 15 regarding the fill level, defines an operating mode I; II; III of the provision device 26, or is configured to define such an operating mode, and to output an appropriate specification, in particular a target specification for the control variable n, to the final control element 28; 41 determining the delivery rate R, in particular to a drive controller of the drive means provision device 26 used to deliver and/or meter the printing ink 21 to be fed. In particular, the implemented program is configured to bring about a switch in the operation from a current operating mode I; II; III to an operating mode II; III; I that is different therefrom as a result of a signal of a sensor 15 regarding the fill level.

So as to prevent excessive temporal fluctuations in the inking device 16 in terms of the conditions for the transfer of ink, the upper and the lower limit values, in particular threshold values L1; $L_{max}$; L2; L0 are not too far apart, but are, for example, no more apart than half the difference ΔL between an empty ink fountain, i.e., for example a lower limit value L0 for the fill level L, and the maximum value $L_{max}$ for the fill level L.

Ink is preferably fed during the automatic mode A of the first embodiment as follows:

In the case of preferably automatic ink feeding, such as is described, e.g., in the following exemplary embodiment, or in particular during the course of the one-part or multi-part program loop implemented in the aforementioned data processing means, the fill level L is monitored for an upper limit value $L_{max}$; L1, which is formed by the possibly provided maximum value $L_{max}$ for the maximum permissible filling, or advantageously by an upper threshold value L1 that is below this maximum value $L_{max}$, and for a lower limit value L0; L2, which is generally formed by a value L0 representing the empty ink reservoir 25, or preferably by a lower threshold value L2 for the fill level L, at which at least a residual amount of printing ink 21 is still available in the ink reservoir 25.

If, during the course of the operation, a fill level L that is lower, compared to the upper limit value $L_{max}$; L1, e.g., the upper threshold value L1, but still above the lower limit value L0; L2, in particular threshold value L2, is registered, e.g., by the sensor 15, the final control element 28, e.g., the drive means 28, in particular the pump 28, determining the delivery rate R or feed rate R, is operated in operating mode I of the aforementioned nominal operation I using the target value $n_S$ for the control variable n which is provided and/or stored for this operating mode I. If, however, during operation, for example during nominal operation I at an, accidentally or intentionally, slightly undersupplying delivery rate R (i.e., for example, being no more than 10%, preferably no more than 5%, below the actual consumption) during nominal operation I, or as a result of an operation in undersupply mode III, the lower threshold value L0; L2, in particular the threshold value L1, is noticed for the fill level L, a switch is made, for example prompted by the implemented program routine, to the second operating mode II, namely an oversupplying mode II having a greater value $n_H$ for the control variable n, in which more printing ink 21 is delivered to the ink reservoir 25 than is consumed by the transfer of printing ink 21 from the ink reservoir 25 downstream to the inking unit 07, and when the upper limit value L1; $L_{max}$ is reached, a switch is made back to nominal operation I at a, for example, slightly undersupplying, delivery rate R and, e.g., a comparatively smaller value $n_S$, for example target value $n_S$, in which slightly less printing ink 21 is delivered to the ink reservoir 25 than is consumed by the transfer of printing ink 21 from the ink reservoir 25 downstream to the inking unit 07.

If the fill level L, during operation, for example due to an oversupply mode II or nominal operation I with, e.g., accidentally or intentionally, slightly oversupplying ink feeding (i.e., for example, being no more than 10%, preferably no more than 5% over the actual consumption), reaches an upper limit value $L_{max}$; L1, defined as an upper limit for the operation and/or for filling, which, for example, is formed by the aforementioned maximum value $L_{max}$ or preferably by the upper threshold value L2 that is below that, a switch is made, prompted for example by the implemented program route, to an operating mode III of the undersupply mode III, in which less printing ink 21 is delivered into the ink reservoir 25 than is consumed by the transfer of printing ink 21 from the ink reservoir 25 downstream to the inking unit 07, so as to switch back to nominal operation I, which here is a slightly oversupplying mode, when the lower limit value L2; $L_{max}$ has been reached.

Figure 8:
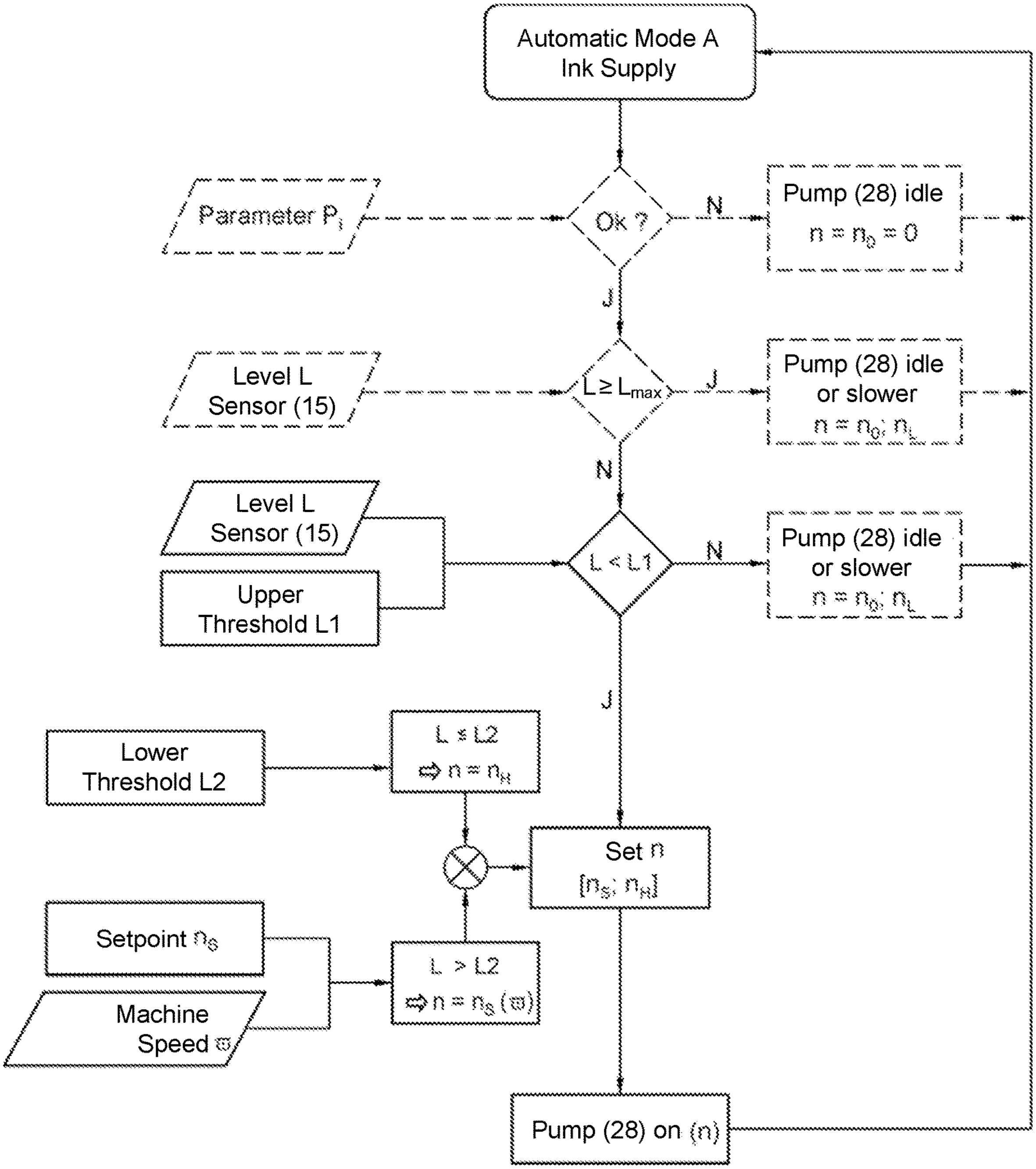
FIG. 8 a simplified flow chart for an automatic operation of the provision device using a lower and an upper limit or threshold value.

In the advantageous embodiment shown, e.g., by way of example in FIG. 8, the upper threshold value L1, serving as the upper limit value L1, does not coincide with the maximum value $L_{max}$, but is below the latter. In this case, for example, in a step prior to the above-described steps in which the fill level L is maintained between the upper and lower limit values L1; L2 or threshold values L1; L2, additionally the fill level L is checked for the presence of the maximum value $L_{max}$ or even a value above that, and, if the result is positive, i.e., at least the maximum value $L_{max}$ is present, a possibly already present undersupply mode III, using a value $n_L$; $n_0$ for the control variable n which is reduced compared to nominal operation I, is maintained or a switch to such an operation is carried out. If, in this case, the fill level L, for example due to an undersupply mode III, e.g., the operation in idle mode III, coming from a higher level, during operation reaches the upper threshold value L1, which is below the maximum value $L_{max}$, a switch is made, prompted for example by the implemented program route, to nominal operation I, which in this case is preferably operating in a slightly undersupplying manner, at least within the above meaning.

Optionally, it can initially be checked in the process for automatic ink feeding, in particular during the course of the one-part or multi-part program loop implemented in the aforementioned data processing means, in one or more steps preceding the aforementioned steps for the fill level-dependent selection of the operating modes I; II; III, whether the prerequisites for automatic filling, i.e., for the operation of the delivery and/or metering final control element 28, in particular drive means 28, are met at all. For this purpose, one or more of the aforementioned parameters $P_i$ are checked for the presence of the conditions required for operational readiness. In the absence of operational readiness, i.e., if at least one condition is not met for the parameter or parameters $P_i$, the final control element 28, in particular the drive means 28, e.g., the pump 28, remains in idle or is transferred to idle, i.e., is left in operating mode III of the idle operation using the value no (n=0) for the control variable n, or is transferred to this mode, until all conditions are met.

One or more of the aforementioned limit or threshold values L0; L1; L2; $L_{max}$ and/or one or more of the values $n_S$; $n_H$; $n_L$ for the control variable n which are to be used in the aforementioned steps or operating modes I; II; III can be predefinable and/or variable via one or more interfaces. For this purpose, a user interface, via which the operator can input or select corresponding values $n_S$; $n_H$; $n_L$, and/or a data interface, via which such values $n_S$; $n_H$; $n_L$ can be fed from a memory medium to the control means, can be provided. In the case of the target value $n_S$, a value $n_S$ that was previously determined, e.g., by calculation or empirically, can be entered at a user interface or be fed via an interface or signal connection from a program route, by means of which a suitable target value $n_S$ is empirically determined using a, for example automated or at least semi-automated, procedure.

As an alternative to or in a refinement of the first embodiment for the aforementioned automatic operation of the ink feeding process in automatic mode A, it is possible, in a second embodiment, for the at least one sensor 15 and the data processing means encompassed by the control means or the program routes implemented there, in particular in the manner of a control loop, to be configured to ascertain a measure of the fill level L in the ink reservoir 25 continuously or at defined intervals, and to vary the target specification for the target value $n_S$ when the fill level L changes iteratively toward an, in particular predefinable, target fill level $L_S$ that is constant over the time t and, e.g., within a permitted interval. In the process, for example with a falling fill level L, the target specification for the control variable n, in particular the operating speed n, is varied toward larger, and, conversely, with a rising fill level L, is varied toward smaller values $n_S$; $n_H$; $n_L$. The variation for the iterative approximation of a stable value $n_S$; $n_H$; $n_L$, in particular the predefined target fill level $L_S$, should be configured to be convergent in the known manner and, e.g., take the magnitude and direction of the change over time into consideration in the determination of the magnitude and direction of the variation. In the process, the respective varied target specification for the control variable n is fed to the final control element 28. For the sake of simplicity, here and hereafter the notion of the collectivity of control means related to the operation of the metering device 27 shall also encompass the present case in which these, strictly speaking, are configured as open-loop and/or closed-loop control means and include corresponding means for closed-loop control.

The second embodiment ultimately provides a design that, e.g., refines the first embodiment, in which the distance between the upper and lower limit values L0; L1; L2; $L_{max}$, in particular threshold values L0; L1; L2; $L_{max}$, has been decreased to such an extent that these coincide for a control process, for example, for the aforementioned fill level $L_S$, for example target fill level $LF_S$, or in particular can be interpreted as tolerance limits flanking a target value for the fill level L on either side. A first target specification for the control variable n can, for example, be a target value $n_S$ that in this case serves as a starting value $n_S$, e.g., for the control process, for the control variable n to be varied.

For the advantageous case where a procedure for empirically determining a suitable target value $n_S$ is provided, this takes place in one or more cycles Z1; Z2; Z6; Zm, wherein one cycle Z1; Z2; Z6; Zm comprises a first phase Ph1, in which the ink reservoir 25 in an undersupply mode III is emptied from the relevant upper limit or threshold value $L_{max}$; L1 to the relevant lower limit value, or in particular threshold value L0; L2, and a second phase Ph2, in which the ink reservoir 25 in an oversupply mode II is filled from the lower limit or threshold value L0; L1 to an upper limit value, or in particular threshold value $L_{max}$; L1. While one or more, for example a number m, of such cycles Z1; Z2; Z6; Zm (m 0 ⌉) are run through, e.g., a measure $N_C$ of the production progress achieved during this time, e.g., a measure $N_C$ of the number of print cycles c, d that have since been run through, i.e., printed printing lengths or printed substrate sheets S; S', is ascertained, as well as a measure $N_D$, which represents the cycle count carried out during this time period, i.e., number of work cycles, by the relevant delivery mechanism 29, in particular a measure $N_D$ representing the number of pump revolutions. If a total covered angle of a component of the printing unit 06, which is to be driven in a true-to-register manner, or of the printing press or its drive is used as the measure $N_C$ for the number of the print cycles c, it is also possible, e.g., to take incomplete print cycles c into consideration. The measure $N_D$ representing the number of pump revolutions can, for example, be formed by the number of work cycles of the drive means 28 driving the pump 28, e.g., the number of revolutions of the drive motor 28, the number of revolutions of a rotating part located in the drive train of the pump 29 or the number of work cycles, for example revolutions, of the pump 29.

Figure 9:
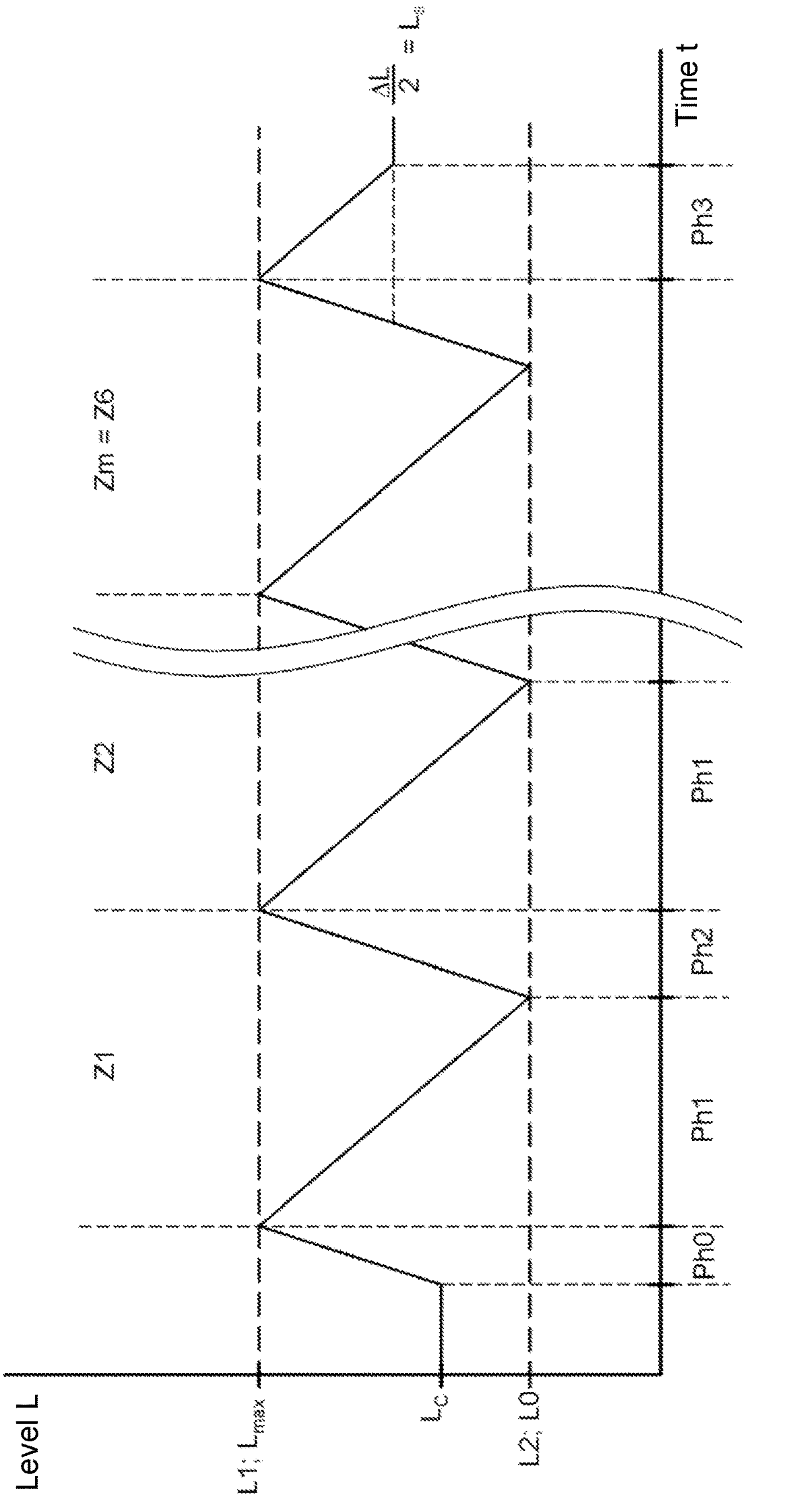
FIG. 9 a schematic illustration of an exemplary operating cycle for empirically determining a consumption-dependent target or starting value specification of the metering pump drive.

Preferably, several such cycles Z1; Z2; Z6; Zm are used for the determination, so that the accuracy of the result that is obtained improves. The designation as "first" and "second" phases Ph1; Ph2 does not necessarily indicate an order, but primarily serves the distinction between the two phases Ph1; Ph2. Even though they are explained and preferred in the manner shown here (e.g., FIG. 9), they can, conversely, also form a cycle Z1; Z2; Z6; Zm initially beginning in each case with the second phase Ph2 together with the subsequent first phase Ph1. The essential aspect here is that at least one such cycle Z1; Z2; Z6; Zm is run through with both phases directly following one another.

Using the number m of considered cycles Z1; Z2; Z6; Zm, the measure $N_C$ for the production progress achieved during the cycle or cycles Z1; Z2; Z6; Zm and the measure $N_D$ for the cycle count carried out during this time period by the delivery mechanism 28, the target value $n_S$, resulting empirically from the consumption of printing ink 21, is determined for the control variable n representing the work cycle rate of the metering device 27, in particular for the operating speed n of the drive motor 28. For the number $N_D$ of revolutions of the drive motor 28, serving as the measure $N_D$ for the cycle count carried out by the delivery mechanism 28, and the number $N_C$ of print cycles, serving as the measure $N_C$ of the production progress, and the information about the machine or production speed ω, serving as the number of print cycles c during a time interval ΔT, for example, a target value or possibly starting value $n_S$, which is based on this time interval ΔT, results for the operating speed n of the drive motor 28 as:

$$n_S[1/\Delta T] = \frac{N_D \times \varpi[1/\Delta T]}{m \times N_C}$$

This shall also be understood accordingly for the case of deviating reference values for the variables used here, possibly using factors not cited here, by way of which the deviating reference values can be converted into one another.

The cycle Z1; Z2; Z6; Zm to be considered can generally, as in the following example, begin with the first phase Ph1, i.e., proceeding from the relevant upper limit or threshold value L2; $L_{max}$ with the lowering process, or with the second phase Ph2, i.e., proceeding from the relevant lower limit or threshold value L2; L0, with the filling process.

In the event that the fill level L, at the beginning of the process for the determination, is not at the upper limit or threshold value L1; $L_{max}$; L2; L0 relevant for the switch, but at the start of the determination process is presently at a fill level $L_C$ ranging between the upper and lower limit values L0; L1; L2; $L_{max}$, the ink supply, for example during the operation of the printing unit 06, is initially filled during a phase Ph0 preceding the first full cycle Z1, e.g., starting phase Ph0, for example in an oversupply mode II, to the relevant upper limit value, or preferably threshold value L1; $L_{max}$ or, for example in an undersupply mode III, is initially lowered to the relevant lower limit value, or preferably threshold value L2; L0, for example so as to achieve a defined starting point for a full cycle Z1; Z2; Z6; Zm.

When the relevant upper limit value, or in particular threshold value $L_{max}$; L1 is reached, a switch is made, during ongoing operation of the printing unit 06 for a, for example, first phase Ph1 of the first or only cycle Z1, to an undersupply mode III, preferably to the idle mode III, of the provision device 26 or the metering device 27 encompassed thereby, and this mode is maintained until the considered lower limit value, or in particular threshold value L0; L1 has been reached. When this lower limit value, in particular threshold value L0; L1 has been reached, a switch is made for a, for example, second phase Ph2 to an oversupply mode II, which is maintained until the relevant upper limit value, or in particular threshold value $L_{max}$; L1 has been reached or is detected by the sensor 15. As previously mentioned, a first or only cycle Z1, and possibly subsequent cycles Z2; Z6; Zm, proceeding from the relevant lower limit value L2; $L_{max}$, can also begin with the second phase Ph2, which is followed by the aforementioned first phase Ph1. In general, criteria and variants set out above can be applied to the oversupply and undersupply modes I; II. So as to achieve enhanced structural safety, the cycle Z1 can be carried out a few more times, e.g., a total of four to eight times, here, for example, six times.

The target value $n_S$ to be predefined for or applied to the nominal operation I is now ascertained in the manner described above by way of the number of considered cycles Z1; Z2; Z6; Zm, the measure $N_C$ for the production progress achieved as the cycle or cycles is or are run through, and the measure $N_D$ for the cycle count carried out during this time period by the delivery mechanism 29. In the process, it is also possible, for example, to take into consideration factors that, e.g., consider a correlation of the identified measures $N_C$; $N_D$ with the variables actually used for the measures $N_C$; $N_D$.

If, subsequent to the operation for the determination of the suitable target value $n_S$, for example directly or only with a short interruption, a production run is to be started or continued, it is possible, for completing the method for empirically determining the target value $n_S$, in a last phase Ph3, for example a final phase Ph3, to bring the fill level L to a fill level $L_S$ ranging between the two limit values L0; L1; L2; $L_{max}$, e.g., a desired starting or target fill level $L_S$, in that the metering device 27, e.g., depending on the most recently taken-on limit value L0; L1; L2; $L_{max}$, is filled in oversupply mode II to the desired fill level $L_S$ or is emptied in undersupply mode III to the desired fill level $L_S$, before the metering device 27 or its drive means 28 then, possibly with a short interruption, is operated in nominal operation I at the previously determined target value $n_S$. So as to achieve a stable operation for as long as possible, the fill level $L_S$ to be targeted, for example, is a fill level L that is at least one third above the lower limit or threshold value L0; L2 relevant for the switch from nominal operation I to oversupply mode II, and at least one third above the upper limit value L1; $L_{max}$ relevant for the switch from oversupply mode II to nominal operation I.

In an advantageous embodiment, the measure $N_D$ used here for the number $N_D$ of work cycles, for example strokes or revolutions, carried out during this time period by the delivery mechanism 29, is the number $N_D$ of revolutions of the drive motor 28 driving the delivery mechanism 28, and its operating speed n is used accordingly as the control variable n. The measure $N_C$ used for the production progress achieved during this time here is preferably the number $N_C$ of print cycles c run through during this time period, or substrate sheets S, which is derived from the operation of the printing press.

As an alternative to the empirical determination, a suitable target value $n_S$ can also by calculation based on the engraving volume $V_G$ known for the pattern to be printed with the relevant printing ink 21 during a print cycle c containing at least one repeat length for the printing operation, i.e. the sum of volumes of the recesses 13 introduced into or present on the gravure inking cylinder 17 in the outer cylindrical surface area effective for the printing width for the length of a print cycle c or a repeat length. This sum can be ascertainable or be ascertained, e.g., from the data regarding the production of the engraving 13, in particular from data of the prepress. For the preferred embodiment of a single-size gravure inking cylinder 17, one such repeat length is provided in the circumferential direction, for double-circumference gravure inking cylinders 17, e.g., two repeat lengths of the same pattern or possibly one repeat length with patterns for two different print images are provided. A print cycle c can generally relate to multiple repeat lengths, preferably however one repeat length, passing through.

This theoretical pick-up volume, however, represents an upper limit, which, in some circumstances, is not reached for various reasons, for example incomplete emptying and/or the substrate S being pushed into the recesses 13, and for this case is corrected, for example, by a correction factor k, which is, e.g., empirically obtained, (here then, e.g., where k<1).

If the delivery volume $V_Z$ per work cycle is known, for example the stroke of a piston pump or a revolution of a rotating volumetric pump 29, e.g., screw pump 28, the work speed that is forecast for a dynamic equilibrium, and in particular a value $n_S$ for the control variable n representing the working speed of the metering device 27, e.g., a variable n representing and/or determining the work cycle rate or the working rotational speed of the delivery mechanism 29, can be derived.

For the aforementioned case where the operating speed n of the drive motor 28 driving the delivery mechanism 29 is used as the control variable n, possibly a gear mechanism 33 provided in the drive train between the delivery mechanism 29 and the rotor of the drive motor 28 can be taken into consideration by a corresponding gear factor g. With this applies, e.g., for the operation of the metering device 27 at the operating speed n, serving as the control variable n, a target value $n_S$ for the operating speed n which theoretically covers the need of printing ink 21 per repeat length or print cycle c of:

$$n_S/c = \frac{V_G/c \times g \times k}{V_Z}$$

wherein the correction factor k is optional, and the gear factor g may only be provided for the case of a gear ratio different from One (g=1) between the motor speed and the rotational speed of the rotating part 32 of the delivery mechanism 29 which is responsible for the delivery.

If the information about the machine or production speed ω relates to the variable that also forms the basis of the assessment of the engraving volume $V_G$ on the gravure inking cylinder 17, here, thus, e.g., to the number $N_C$ of print cycles c to be run through during a certain time interval, the forecast target value $n_S$ for the target specification of the control variable n representing the working speed of the metering device 27, e.g., the target value $n_S$ for the operating speed n, for example revolutions per time interval, of the drive means 28 is:

$$n_S = \frac{V_G \times g \times k}{V_Z} \times \varpi$$

Of course, different units of reference for the considered time interval possibly must be taken into consideration, by using appropriate factors, for the specification at the drive means 28, e.g., minute-based, and the information about the machine or production speed ω (for example based on the hour).

In an embodiment refining the automatic mode A described above, it may be provided in a further step that, during the production operation, the frequency, i.e., for example, the number of times based on a time interval, with which the upper and/or lower threshold values L1; $L_{max}$; L2; L0 relevant for the switch between the operating modes I; II; III has been reached is ascertained, and, when a, for example definable, upper limit is exceeded for the frequency for the case in which the target value $n_S$ is determined by calculation by the control means, an, in particular opposing, change in the aforementioned correction value K or, for the case of an empirical determination, a renewed start of the process for determining the target value $n_S$ is proposed or even initiated by appropriate display means. For example, this can be provided at a frequency of more than one, e.g., two such events per hour.

In a different refinement for the above-described automatic mode A, the filling in oversupply mode II can be monitored, after the lower limit or threshold value L1; $L_{max}$;

L2; L0 has been reached, in such a way that an alarm is output and/or the operation of the machine is aborted or at least the further substrate infeed into the machine is interrupted in the case where, after a defined time period after the oversupply mode II has been triggered, the upper limit or threshold value L1; $L_{max}$ has not been reached. This can be the case, for example, when the upper limit value L1; $L_{max}$ has not been reached again after, e.g., one minute.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. An ink feed system for providing and feeding printing ink (21) to an inking unit (07) of an intaglio printing unit (06), the inking unit (07) comprising an inking device (16), which is provided in the inking unit (07), and comprising a provision device (26), by which printing ink (21) can be fed to the inking device (16) via at least one line (34); the provision device (26) comprising a storage receptacle (38) in which an ink reservoir (25) of printing ink (21) can be kept available and which has an outlet (46), through which the printing ink (21) can be transferred from the storage receptacle (38) into a line path leading to the inking device (16); the provision device (26) further comprising at least one delivery device (37), which supports and/or effectuates delivery of the printing ink (21) from the storage receptacle (38), characterized in that a metering device (27) is provided in the line path, the metering device (27) arranged downstream from the at least one delivery device (37) and the outlet (46), the metering device (27) driven by a drive motor (28) and, on an output side, can provide a mass flow or volume flow that correlates with a working speed of the metering device (27) via a defined relationship, that the drive motor (28) that drives the metering device (27) is in a signal connection with a control device (36) comprising control means that controls, by open-loop or closed-loop control, the working speed of the metering device (27) via the drive motor 28, that the control device and/or the control means controlling by open-loop or closed-loop control the working speed of the metering device (27) are connected, in terms of signaling, to a source supplying information about a current machine speed, and that a functional or tabular relationship between a target value ($n_S$) of a control variable (n), determining the working speed of the metering device (27), and a variable representing a machine speed (ω) is stored by the control means, and which, when used by the control means, allows the target value ($n_S$) to be varied, as a function of a variable that can be supplied or is supplied to the control means on an input side and that represents the machine speed (ω), the ink feed system further comprising a sensor system having a signal connection to the control means, and including at least one sensor (15), which is arranged in an ink supply of the inking unit (07), so as to provide signals representing information about a fill level (L), and that the sensor system and the control means are configured to maintain the fill level (L) in an ink supply chamber comprised by the inking device (16) in a permitted range between an upper and a lower limit, or threshold value (L1; $L_{max}$; L2; L0), or at a desired target fill level ($L_S$), by varying the working speed of the metering device (27) via the drive motor 28, and using signals provided by the sensor system.

2. The ink feed system according to claim 1, characterized in that a wall (39; 47), encompassing the outlet (46), of a part structure delimiting a space for the ink reservoir (25) in the storage receptacle (38) comprises a heating device (48), by which the wall (39; 47) on at least a side facing the ink reservoir (25) can be heated and/or temperature-controlled.

3. The ink feed system according to claim 2, characterized in that a sensor (49) for ascertaining a temperature present at a relevant measuring location is provided in or on the wall (39; 47) encompassing the outlet (46).

4. The ink feed system according to claim 1, characterized in that the metering device (27) comprises a volumetrically and/or rotatably operating delivery mechanism (29), which is driven by the drive motor (28), and/or the metering device (27) is configured as an eccentric pump (29).

5. The ink feed system according to claim 1, characterized in that the delivery device (27; 37), which supports and/or effectuates the delivery of the printing ink (21) from the storage receptacle (38), is configured to apply a force, which is definable and/or effectuates or at least supports the delivery of the ink, to the printing ink (21) present in the ink reservoir (25) via a drive means (41).

6. The ink feed system according to claim 1, characterized in that the delivery device (27; 37), which supports and/or effectuates the delivery of the printing ink (21) from the storage receptacle (38), comprises a displacement member (39), to which a force can be applied via one or more drive means (41) and by which, during application of the force, a higher pressure compared to an ambient pressure can be applied to the printing ink (21) accommodated in the storage receptacle (38).

7. The ink feed system according to claim 6, characterized in that the displacement member (39) is configured as a ram (39) that is lowered into an interior of the storage receptacle (38), the ram (39) acting on the ink reservoir (25) and a portion of the storage receptacle (38) additionally delimiting a reserve volume being movable relative to one another for varying the reserve volume and/or that the displacement member (39) can be acted upon by the force that acts on the printing ink (21) indirectly by one or more pressure medium-actuated actuators (41), or directly by the application of pressure to a space located in the storage receptacle (38) on its side facing away from the ink reservoir (25).

8. An intaglio printing unit (06), comprising a forme cylinder (11) and an inking unit (07), which comprises an inking device (16) containing an ink supply chamber, by which a first inking unit cylinder (17) can be inked, on an outer cylindrical surface (23) of the first inking unit cylinder (17), with printing ink (21) provided in the ink supply chamber, characterized by an ink feed system according to claim 1 comprising a provision device (26) assigned or allocated to the intaglio printing unit (06).

9. The printing unit according to claim 8, characterized in that the first inking unit cylinder (17) on the outer cylindrical surface (23) includes recesses (13) that correspond to individual recesses (14) around a circumference of the forme cylinder (11).

* * * * *